(12) United States Patent
Deng

(10) Patent No.: US 10,719,560 B2
(45) Date of Patent: Jul. 21, 2020

(54) SYSTEM FOR IDENTIFYING, ASSOCIATING, SEARCHING AND PRESENTING DOCUMENTS BASED ON RELATION COMBINATION

(71) Applicant: Yinsheng Deng, Shanghai (CN)

(72) Inventor: Yinsheng Deng, Shanghai (CN)

(*) Notice: Subject to any disclaimer, the term of this patent is extended or adjusted under 35 U.S.C. 154(b) by 625 days.

(21) Appl. No.: 15/121,264

(22) PCT Filed: Dec. 15, 2014

(86) PCT No.: PCT/CN2014/093812
§ 371 (c)(1),
(2) Date: Aug. 24, 2016

(87) PCT Pub. No.: WO2015/176526
PCT Pub. Date: Nov. 26, 2015

(65) Prior Publication Data
US 2017/0124075 A1    May 4, 2017

(30) Foreign Application Priority Data
May 23, 2014  (CN) .......................... 2014 1 0220181

(51) Int. Cl.
*G06F 16/00* (2019.01)
*G06F 16/93* (2019.01)
(Continued)

(52) U.S. Cl.
CPC ............ *G06F 16/93* (2019.01); *G06F 16/113* (2019.01); *G06F 16/285* (2019.01);
(Continued)

(58) Field of Classification Search
CPC .. G06F 16/951; G06F 16/2228; G06F 16/382; G06F 16/907; G06F 16/285;
(Continued)

(56) References Cited

U.S. PATENT DOCUMENTS 9,311,624 B2* 4/2016 Diament .............. G06Q 10/101
2004/0064442 A1* 4/2004 Popovitch ............ G06F 16/951
(Continued)

FOREIGN PATENT DOCUMENTS

CN         1853180 A    10/2006
CN       102314424 A     1/2012
(Continued)

OTHER PUBLICATIONS

Paladhi, Sibabrata, and Sivaji Bandyopadhyay. "A Document Graph Based Query Focused Multi-Document Summarizer." Proceedings of the 2nd workshop on Cross Lingual Information Access (CLIA) Addressing the Information Need of Multilingual Societies. 2008.*
(Continued)

*Primary Examiner* — Nan Hutton
(74) *Attorney, Agent, or Firm* — Fitch, Even, Tabin & Flannery LLP

(57) ABSTRACT

The present invention discloses a system for identifying, associating, searching and presenting documents based on relation combination, which builds a computer system-based knowledge management system in a professional field and improves the learning efficiency and utilization of professional knowledge. The technical solution includes finding a series of documents having an inter-document logical relationship with a group of specific keywords from massive documents in a keyword search manner, and naming a relation graph among the specific series of documents with a group of keywords strongly correlated therewith; combining, into one set, a plurality of inter-document relation graphs of which the names have a group of like term keywords and which have specific logical relationships among one another, and naming the same with the group of like term keywords in a certain logic order. On this basis, the inter-document relation graphs mentioned above are pre-
(Continued)

sented from multiple perspectives and in multiple layers by means of graphicalization and a set sequence based on a specific logical relationship in a manner complying with the logic of human brain thinking process.

12 Claims, 17 Drawing Sheets

(51) Int. Cl.
  *G06F 16/11* (2019.01)
  *G06F 16/28* (2019.01)
  *G06F 16/951* (2019.01)
  *G06F 16/901* (2019.01)
  *G06F 16/33* (2019.01)
  *G06F 16/35* (2019.01)

(52) U.S. Cl.
  CPC ............ *G06F 16/288* (2019.01); *G06F 16/33* (2019.01); *G06F 16/35* (2019.01); *G06F 16/358* (2019.01); *G06F 16/9024* (2019.01); *G06F 16/951* (2019.01)

(58) Field of Classification Search
  CPC ........ G06F 16/35; G06F 16/358; G06F 16/33; G06F 16/383
  See application file for complete search history.

(56) References Cited

U.S. PATENT DOCUMENTS

| 2008/0235190 A1* | 9/2008 | Zhao | G06F 16/90335 |
| 2009/0049108 A1* | 2/2009 | Forde | G06Q 10/06 |
| 2012/0259855 A1* | 10/2012 | Mizuguchi | G06F 16/355 707/739 |
| 2017/0132219 A1 | 5/2017 | Deng | |

FOREIGN PATENT DOCUMENTS

| CN | 102880623 A | 1/2013 |
| CN | 103914486 A | 7/2014 |
| CN | 103914487 A | 7/2014 |
| CN | 103914488 A | 7/2014 |
| WO | 2015176525 | 11/2015 |

OTHER PUBLICATIONS

Burford, Clint, Steven Bird, and Timothy Baldwin. "Collective document classification with implicit inter-document semantic relationships." Proceedings of the fourth joint conference on lexical and computational semantics. 2015.*

International Search Report for International Application No. PCT/CN2014/093812 dated Mar. 13, 2015.

USPTO; U.S. Appl. No. 15/121,247; Office Action dated Jul. 26, 2019.

* cited by examiner

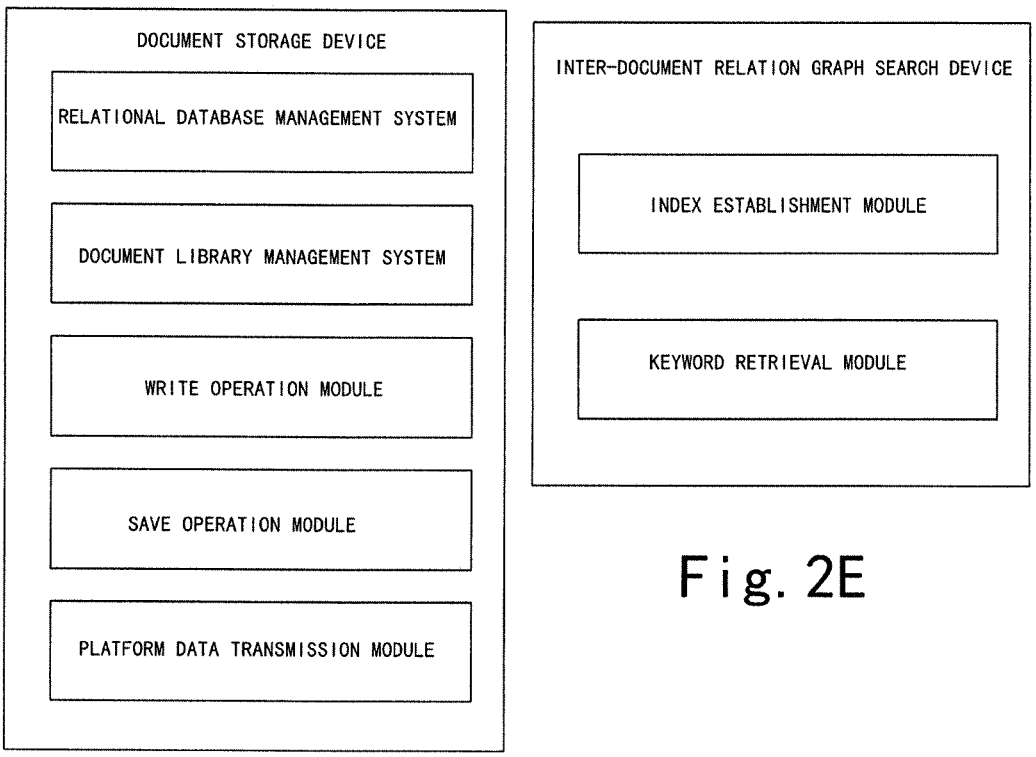
Fig. 2D
Fig. 2E
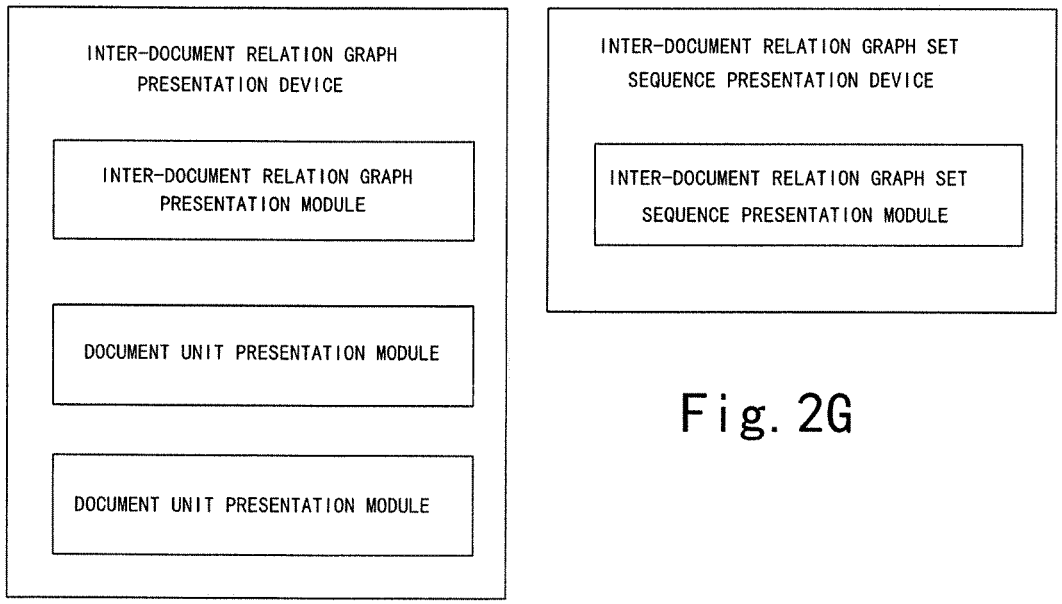
Fig. 2F
Fig. 2G

SYSTEM FOR IDENTIFYING, ASSOCIATING, SEARCHING AND PRESENTING DOCUMENTS BASED ON RELATION COMBINATION

FIELD OF THE INVENTION

The present invention relates to document systems, and more particularly, to highly-efficient processing systems for identifying, associating, searching and presenting online or stand-alone documents (including those in hand-held apparatuses) in a specific professional field.

BACKGROUND

Professionals acquire, learn and study documents via many existing systems for searching and presenting documents. They obtain effective information from various documents with different creation dates and authors (independent authors or co-authors), serving as a basis of reference for conducting certain behaviour. It is possible that a certain knowledge which is eventually needed may just account for no more than 5% of the queried documents, and these knowledge may be scattered in several documents which are not seemingly correlated.

The applicant has recognized that there is a need to find, for those professionals, accurate information meeting their requirements in their fields of interest. That is, it is very time-consuming to extract a solution for corresponding information from massive documents. In addition, there are very few people who are capable of providing similar services for those professionals.

Therefore, the applicant has recognized that there is a need to provide a better system and method for identifying, associating, searching and presenting documents.

SUMMARY

To address the problems mentioned above, the present invention provides a system for identifying, associating, searching and presenting documents based on relation combination, and builds a computer system-based knowledge management system for a certain professional field and improves the learning efficiency and utilization of professional field knowledge.

The present invention discloses a system for identifying, associating, searching and presenting documents based on relation combination, comprising a document classification storage management platform server, a document library platform server and a client access device, wherein the document classification storage management platform server comprises a single-document identification and association device, an inter-document relation graph establishment device and an inter-document relation graph set sequence construction device; the document library platform server comprises an inter-document relation graph search device, an inter-document relation graph presentation device and an inter-document relation graph set sequence presentation device. Primary nodes of a document storage device are deployed on the document classification storage management platform server, and mirrored versions of the primary nodes of the document storage device are deployed on the document library platform server.

The single-document identification and association device classifies and defines preset professional terms in accordance with different dimensions and hierarchies, establishes and maintains a list of keywords for a respective professional field, defines a single document in accordance with different attributes and hierarchies, sets several document units in the single document, performs system identification on the document units with several keywords, defines a list of logical relationships that may be developed between any two single documents or document units, and associate logical relationship between any two single documents by means of a set logical relationship category.

The inter-document relation graph establishment device defines an inter-document relation graph and defines relationships among elements of the inter-document relation graph.

The inter-document relation graph set sequence construction device superimposes and combines, into one set, a plurality of visualized inter-document relation graphs of which the names have a group of like term keywords and which have specific logical relationships among one another, and names the same with the group of like term keywords in a certain logic order, and then define sets having similar or close logics in a combination manner, and sequentializes the same.

The document storage device stores relevant information in a database of the document classification storage management platform server according to the invocation of the single-document identification and association device, the inter-document relation graph establishment device and the inter-document relation graph set sequence construction device, archives files in a specified format to the document library platform server, and transfers relevant data information between the document classification storage management platform server and the document library platform server via a data exchange engine.

The inter-document relation graph search device establishes an inter-document relation graph index having an auto-maintenance function, and performs a full-text retrieval for an inter-document relation graph name according to one or more query terms input at one time.

The inter-document relation graph presentation device presents the inter-document relation graph, separately presents a certain document unit in the inter-document relation graph and presents full text of a single document corresponding to the certain document unit in the inter-document relation graph; and The inter-document relation graph set sequence presentation device presents in sequence inter-document relation graphs contained in each set in the inter-document relation graph set sequence in accordance with a certain logical relationship, and randomly performs seamless switches between each inter-document relation graph in the set sequence and presents the switched one.

According to an embodiment of the system for identifying, associating, searching and presenting documents based on relation combination of the present invention, the single-document identification and association device further comprises the following modules:

a keyword dimension setting module for setting keyword dimensions;

a keyword definition module coupled to the keyword dimension setting module, for defining keywords corresponding to various keyword dimensions;

a document classification setting module for performing classification setting on the single document based on the keywords; and a document fragment setting module for performing classification setting on various document fragments of the document based on the keywords.

According to an embodiment of the system for identifying, associating, searching and presenting documents based on relation combination of the present invention, the single-document identification and association device further comprises the following modules:

a document unit setting module for combining document fragments of the single document having the same keyword identification into several document units;

a document unit identification module for performing system identification on the document units with several keywords; and a logic association module for defining the list of logical relationships that may be developed between any two single documents, and associating logical relationship between two single documents or document units in the system by means of the set logical relationship category.

According to an embodiment of the system for identifying, associating, searching and presenting documents based on relation combination of the present invention, the inter-document relation graph establishment device further comprises the following modules:

a keyword naming module for naming any specific inter-document relation graph with a specific group of keywords; and an inter-document relation graph generation module for generating the inter-document relation graph by presenting a series of document units arranged in accordance with a specific logical relationship among the document units in the inter-document relation graph, presenting graphical identification of the logical relationship among the document units, and presenting a single document unit.

According to an embodiment of the system for identifying, associating, searching and presenting documents based on relation combination of the present invention, the inter-document relation graph set sequence construction device further comprises the following modules:

an inter-document relation graph set sequence generation module for combining, into one set, a plurality of visualized inter-document relation graphs of which the names have a group of like term keywords and which have specific logical relationships among one another, and naming same with the group of like term keywords in a certain logic order, wherein inter-document relation graphs in the set are arranged in a certain logical relationship, and then defining sets having similar or close logics in a combination manner and arranging the set in accordance with a certain rule, and sequentializing the same.

According to an embodiment of the system for identifying, associating, searching and presenting documents based on relation combination of the present invention, the document storage device further comprises the following elements:

a relational database management system for establishing a document classification storage management platform;

a document library management system for establishing a document library platform;

a write operation module for performing write operations on a database when the devices are invoked;

a save operation module for archiving to save corresponding single-document files or inter-document relation graph files when the devices are invoked; and a platform data transmission module for transferring relevant data between the document classification storage management platform server and the document library platform server via the data exchange engine.

According to an embodiment of the system for identifying, associating, searching and presenting documents based on relation combination of the present invention, the inter-document relation graph search device further comprises the following modules:

an index establishment module for establishing a set of inter-document relation graph indices having an auto-maintenance function; and a keyword retrieval module for performing a full-text retrieval for the inter-document relation graph name according to query terms input by a user.

According to an embodiment of the system for identifying, associating, searching and presenting documents based on relation combination of the present invention, the inter-document relation graph presentation device further comprises the following modules:

an inter-document relation graph presentation module for presenting a specified inter-document relation graph according to a search result of the user;

a document unit presentation module for presenting a certain document unit in the specified inter-document relation graph according to the search result of the user; and a single-document presentation module for presenting full text of a single document corresponding to the certain document unit in the specified inter-document relation graph according to the search result of the user.

According to an embodiment of the system for identifying, associating, searching and presenting documents based on relation combination of the present invention, the inter-document relation graph set sequence presentation device further comprises the following module:

an inter-document relation graph set sequence presentation module for presenting in sequence inter-document relation graphs contained in each set in the inter-document relation graph set sequence in accordance with a certain logical relationship, and randomly performing seamless switches between each inter-document relation graph in the set sequence and presenting the switched one in a layer-by-layer manner.

According to an embodiment of the system for identifying, associating, searching and presenting documents based on relation combination of the present invention, the system further comprises a document interpretation acquisition platform server which comprises the following devices:

a document interpretation acquisition device for acquiring data input by a user related to a document interpretation content;

a data acquisition review device for reviewing the input data acquired; and a document interpretation storage device for linking the input data related to the document interpretation content which qualifies the review to a corresponding document or inter-document relation graph for storage.

According to an embodiment of the system for identifying, associating, searching and presenting documents based on relation combination of the present invention, the logical relationships between documents include, but are not limited to, a derivative relationship, a parallel relationship, an OR relationship, an AND relationship, a containment relationship, a revision relationship, a coverage relationship, a negation relationship, wherein each logical relationship between documents corresponds to a unique icon in the system.

According to an embodiment of the system for identifying, associating, searching and presenting documents based on relation combination of the present invention, a detailed implementation further comprises a service architecture constructed on the basis of cloud technologies for implementing services such as data query, program update and file update at a cloud end.

According to an embodiment of the system for identifying, associating, searching and presenting documents based on relation combination of the present invention, the documents include, but are not limited to, theses, textbooks, historical literatures, laws and regulations, training coursewares, news and announcements, and include, but are not limited to, multimedia mediums such as characters, audios, videos, webpages.

The present invention further discloses a system for identifying, associating, searching and presenting documents based on relation combination, running on a single apparatus in a stand-alone manner, and comprising the following elements:

a single-document identification and association device for classifying and defining preset professional terms in accordance with different dimensions and hierarchies, establishing and maintaining a list of keywords for a respective professional field, defining a single document in accordance with different attributes and hierarchies, setting several document units in the single document, performing system identification on the document units with several keywords, defining a list of logical relationships that may be developed between any two single documents or document units, and associating logical relationship between two single documents based on a set logical relationship category;

an inter-document relation graph establishment device for defining an inter-document relation graph and defining relationships among elements of the inter-document relation graph;

an inter-document relation graph set sequence construction device for combining, into one set, a plurality of visualized inter-document relation graphs of which the names have a group of like term keywords and which have specific logical relationships among one another, and naming the same with the group of like term keywords in a certain logic order, and then defining sets having similar or close logics in a combination manner, and sequentializing the same;

a document storage device for storing relevant information to a database of the single apparatus according to the invocation of the single-document identification and association device, the inter-document relation graph establishment device and the inter-document relation graph set sequence construction device, and archiving files in a specified format to the database of the single apparatus;

an inter-document relation graph search device for establishing an inter-document relation graph index having an auto-maintenance function, and performing a full-text retrieval for an inter-document relation graph name according to one or more query terms input at one time;

an inter-document relation graph presentation device for presenting the inter-document relation graph, separately presenting a certain document unit in the inter-document relation graph and presenting full text of a single document corresponding to the certain document unit in the inter-document relation graph;

an inter-document relation graph set sequence presentation device for presenting in sequence inter-document relation graphs contained in each set in the inter-document relation graph set sequence in accordance with a certain logical relationship, and randomly performing seamless switches between each inter-document relation graph in the set sequence and presenting the switched one;

a stand-alone packaging and releasing device for packaging data ultimately saved by the document storage device and the files in the specified format archived in the document storage device, a program-executable file and matched subsidiary files for the inter-document relation graph search device, a program-executable file and matched subsidiary files for the inter-document relation graph presentation device, and a program-executable file and matched subsidiary files for the inter-document relation graph set sequence presentation device into one complete release package, and generating targeted program-executable files and matched subsidiary files for the releasing device depending on different target platforms; and a client installation device for completely delivering the release package to the single apparatus by executing the program-executable files for the releasing device, the program-executable files comprising: the data ultimately saved by the document storage device and the files in the specified format archived in the document storage device, the program-executable file and the matched subsidiary files for the inter-document relation graph search device, the program-executable file and the matched subsidiary files for the inter-document relation graph presentation device, and the program-executable file and the matched subsidiary files for the inter-document relation graph set sequence presentation device.

According to an embodiment of the system for identifying, associating, searching and presenting documents based on relation combination of the present invention, the single-document identification and association device further comprises the following modules:

a keyword dimension setting module for setting keyword dimensions;

a keyword definition module coupled to the keyword dimension setting module, for defining keywords corresponding to various keyword dimensions;

a document classification setting module for performing classification setting on the single document based on the keywords; and a document fragment setting module for performing classification setting on various document fragments of the document based on the keywords.

According to an embodiment of the system for identifying, associating, searching and presenting documents based on relation combination of the present invention, the single-document identification and association device further comprises the following modules:

a document unit setting module for combining document fragments of the single document having the same keyword identification into several document units;

a document unit identification module for performing system identification on the document units with several keywords; and a logic association module for defining the list of logical relationships that may be developed between any two single documents, and associating logical relationship between two single documents or document units in the system by means of the set logical relationship category.

According to an embodiment of the system for identifying, associating, searching and presenting documents based on relation combination of the present invention, the inter-document relation graph establishment device further comprises the following modules:

a keyword naming module for naming any specific inter-document relation graph with a specific group of keywords; and an inter-document relation graph generation module for generating the inter-document relation graph by presenting a series of document units arranged in accordance with a specific logical relationship among the document units in the inter-document relation graph, presenting graphical identification of the logical relationship among the document units, and presenting a single document unit.

According to an embodiment of the system for identifying, associating, searching and presenting documents based on relation combination of the present invention, the inter-document relation graph set sequence construction device further comprises the following module:

an inter-document relation graph set sequence generation module for combining, into one set, a plurality of visualized inter-document relation graphs of which the names have a group of like term keywords and which have specific logical relationships among one another, and naming the same with the group of like term keywords in a certain logic order, wherein inter-document relation graphs in the set are arranged in a certain logical relationship, and then defining sets having similar or close logics in a combination manner and arranging the set in accordance with a certain rule, and sequentializing the same.

According to an embodiment of the system for identifying, associating, searching and presenting documents based on relation combination of the present invention, the inter-document relation graph search device further comprises the following modules:

an index establishment module for establishing a set of inter-document relation graph indices having an auto-maintenance function; and a keyword retrieval module for performing a full-text retrieval for the inter-document relation graph name according to one or more query terms input by a user at one time.

According to an embodiment of the system for identifying, associating, searching and presenting documents based on relation combination of the present invention, the inter-document relation graph presentation device further comprises the following modules:

an inter-document relation graph presentation module for presenting a specified inter-document relation graph according to a search result of the user;

a document unit presentation module for presenting a certain document unit in the specified inter-document relation graph according to the search result of the user; and a single-document presentation module for presenting full text of a single document corresponding to the certain document unit in the specified inter-document relation graph according to the search result of the user.

According to an embodiment of the system for identifying, associating, searching and presenting documents based on relation combination of the present invention, the inter-document relation graph set sequence presentation device further comprises:

an inter-document relation graph set sequence presentation module for presenting in sequence inter-document relation graphs contained in each set in the inter-document relation graph set sequence in accordance with a certain logical relationship, and randomly performing seamless switches between each inter-document relation graph in the set sequence and presenting the switched one in a layer-by-layer manner.

According to an embodiment of the system for identifying, associating, searching and presenting documents based on relation combination of the present invention, the system further comprises a document interpretation acquisition subsystem which comprises the following devices:

a document interpretation acquisition device for acquiring data input by a user related to a document interpretation content;

a data acquisition review device for reviewing the input data acquired; and a document interpretation storage device for linking the input data related to the document interpretation content which qualifies the review to a corresponding document or inter-document relation graph for storage.

According to an embodiment of the system for identifying, associating, searching and presenting documents based on relation combination of the present invention, the logical relationships between documents include, but are not limited to, a derivative relationship, a parallel relationship, an OR relationship, an AND relationship, a containment relationship, a revision relationship, a coverage relationship, a negation relationship, wherein each logical relationship between documents corresponds to a unique icon in the system.

According to an embodiment of the system for identifying, associating, searching and presenting documents based on relation combination of the present invention, the documents include, but are not limited to, theses, textbooks, historical literatures, laws and regulations, training coursewares, news and announcements, and the documents further include, but are not limited to, multimedia mediums such as characters, audios, videos, webpages.

Compared to the prior art, the present invention exhibits the following beneficial effects. The solution of the present invention includes finding a series of documents having an inter-document logical relationship with a group of specific keywords from massive documents in a keyword search manner, and naming a relation graph among the specific series of documents with a group of keywords strongly correlated therewith; combining, into one set, a plurality of inter-document relation graphs of which the names have a group of like term keywords and which have specific logical relationships among one another, and naming the same with the group of like term keywords in a certain logic order. On this basis, the inter-document relation graphs mentioned above are presented from multiple perspectives and in multiple layers by means of graphicalization and a set sequence based on a specific logical relationship in a manner complying with the logic of human brain thinking process. Meanwhile, the user can perform retrievals for a relevant inter-document relation graph and a set sequence thereof at a system foreground by means of one or more query terms input at one time. Specifically, the solution of the present invention is to collect and save increasing documents in a certain professional field via several server clusters in an predetermined sorting manner, and place the same in a corresponding database for storage. After acquiring a latest document, the document classification storage management platform performs keyword identification and document fragment classification on the document in accordance with key words in multiple dimensions, extracts all corresponding document fragments according to specified keywords so as to form document units, establishes keyword indices and generates an inter-document relation graph complying with the logic of human brain thinking process by means of the document units at the same time, and names the inter-document relation graph with the keywords in multiple dimensions whilst also presenting the logic combination in a logic order and combining a plurality of inter-document relation graphs which have specific logical relationships among one another into one set, and names the set with a group of like term keywords. The document and the indices thereof after document fragment classification and definition of the keyword in multiple dimensions, and rule names combined in accordance with similar or close logics and their indices, and inter-document relation graphs complying with the logic of human brain thinking process are delivered to the document library platform via the data exchange engine. The system user can login via a computer terminal or access via webpage portals of document library platforms of other stand-alone apparatuses (containing hand-held apparatuses), and query specific documents and inter-document relation graphs by means of keywords in multiple dimensions input in the system, and the system will perform segmentation according to user input, and then perform a full-text retrieval in elements such as document full-text and inter-document relation graph names, and automatically rank same in accordance with association degrees to help the user to find a relation graph for relevant knowledge points.

The building of the system may assist the user to search for the complete contents of and relevant information about some specific inter-document relation graph from massive documents in a database at the fastest speed, thereby improving the learning efficiency and utilization of professional field knowledge.

BRIEF DESCRIPTION OF THE DRAWING(S)

FIGS. 2A-2G illustrates detailed structures of various devices in the system, respectively;

Figure 1:
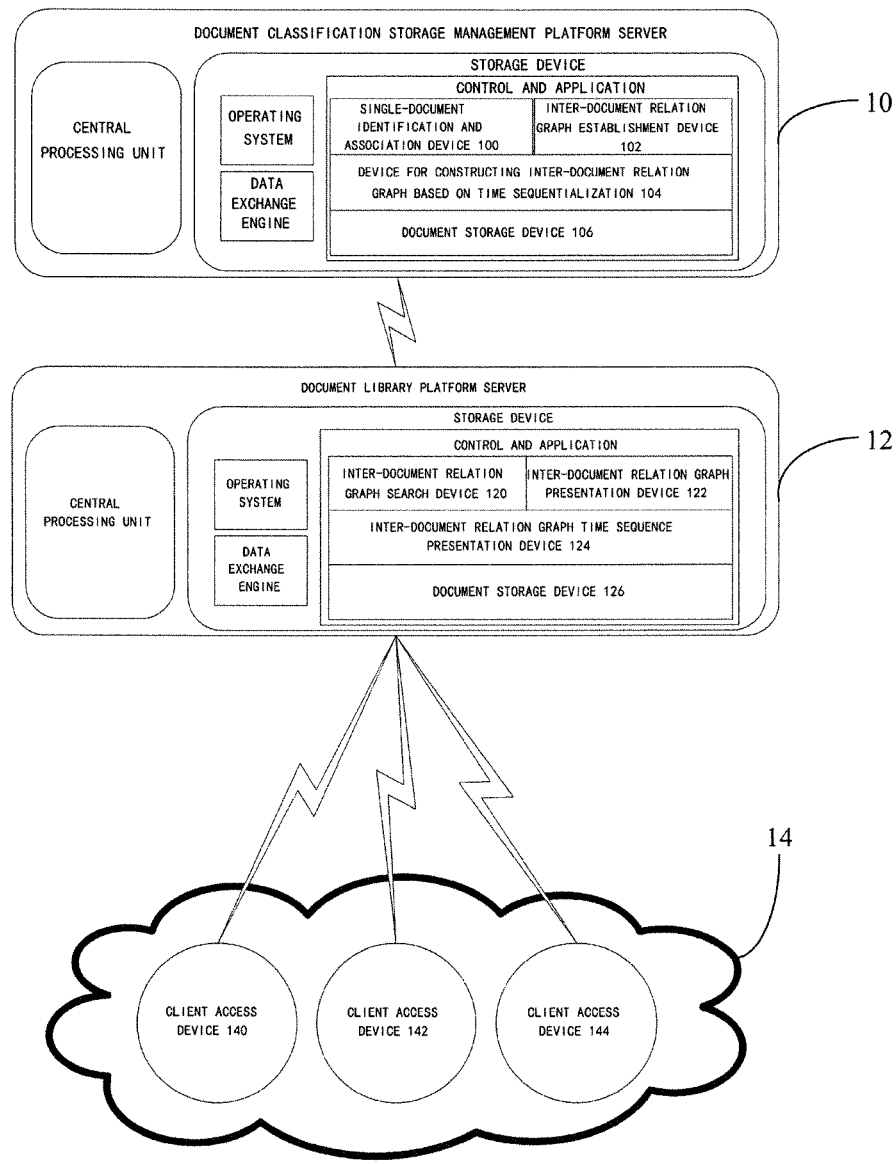
FIG. 1 illustrates a block diagram of a first embodiment of a system for identifying, associating, searching and presenting documents based on relation combination of the present invention.
Figure 6A:
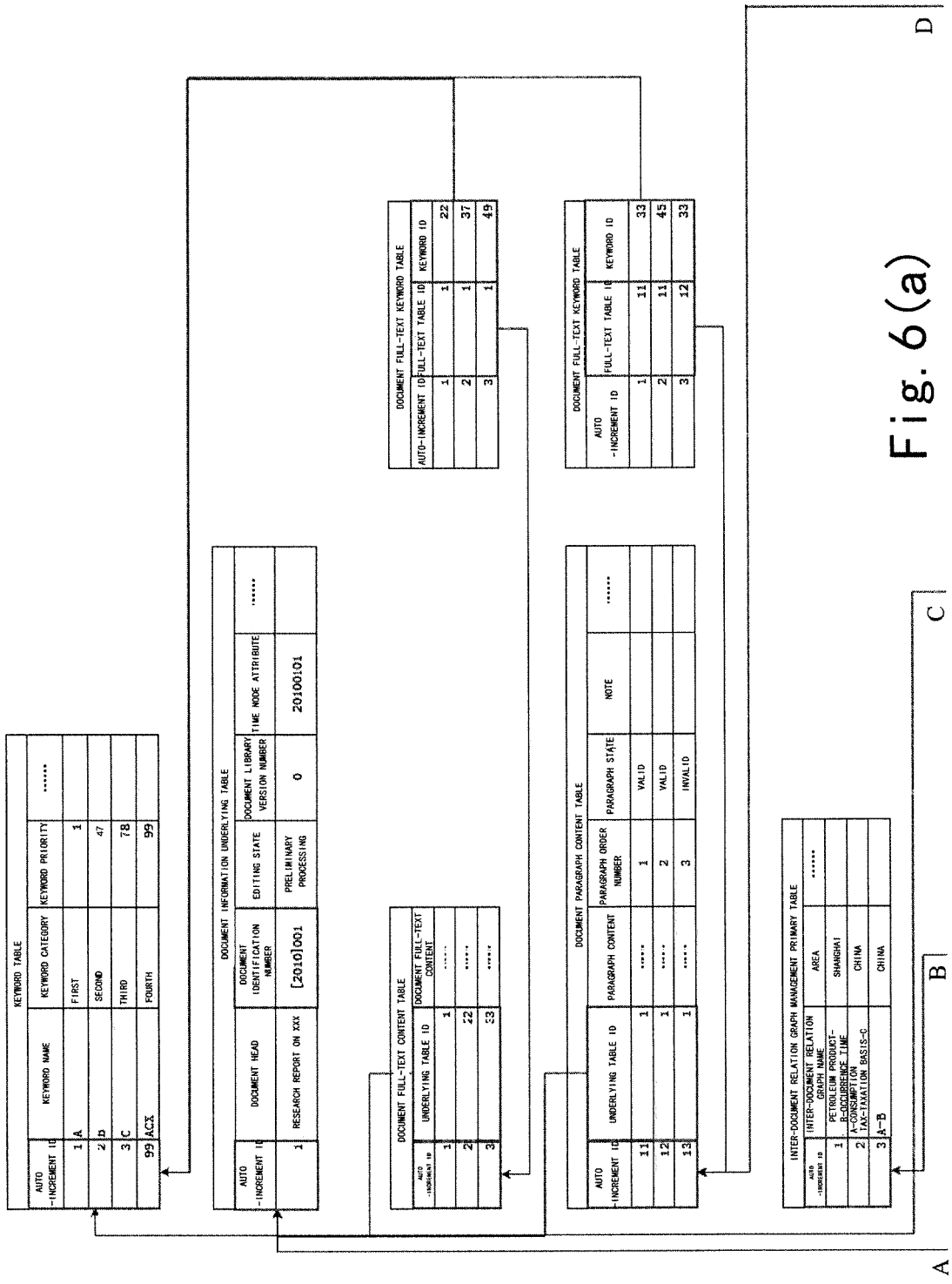
Figure 6B:
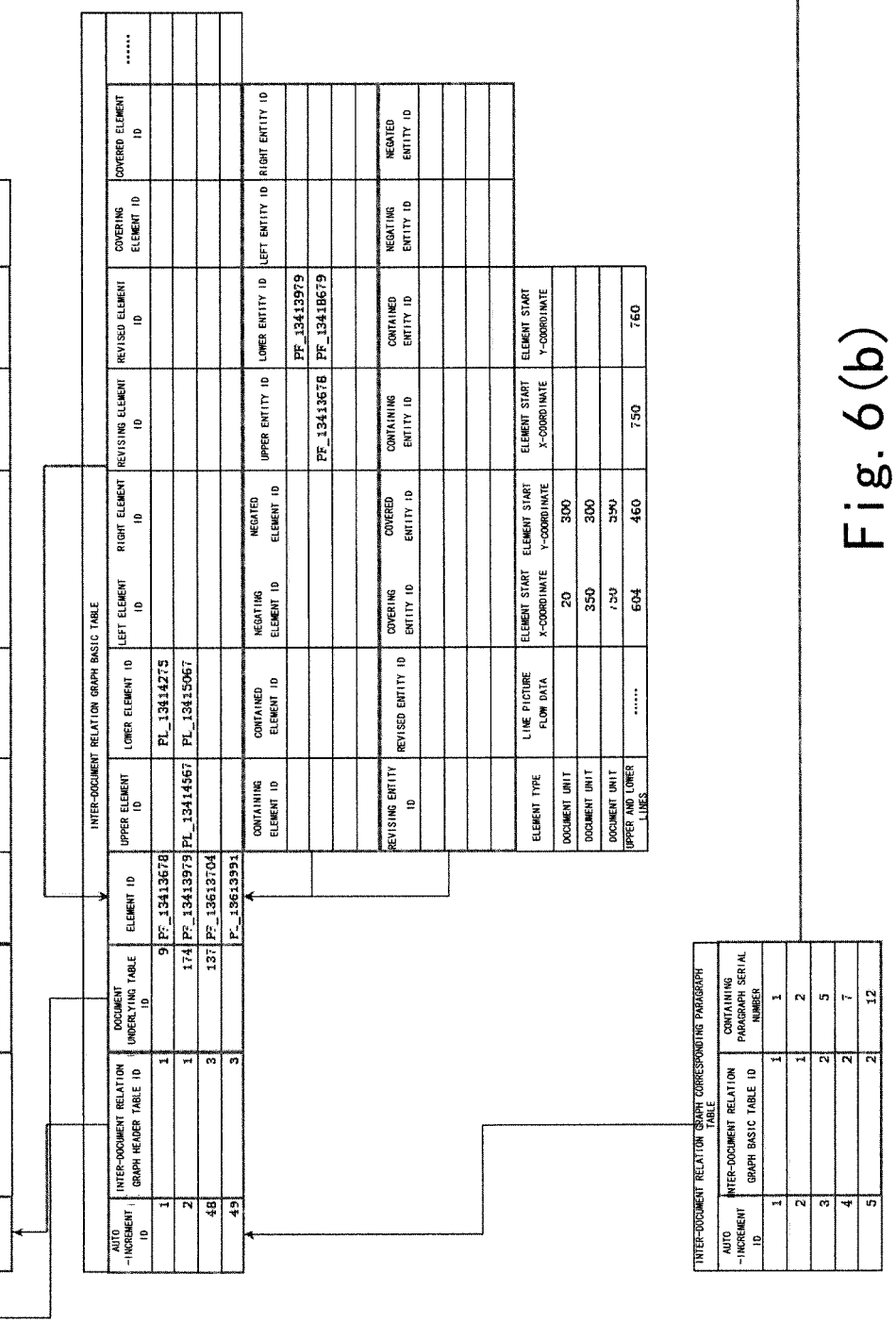
Figure 7:
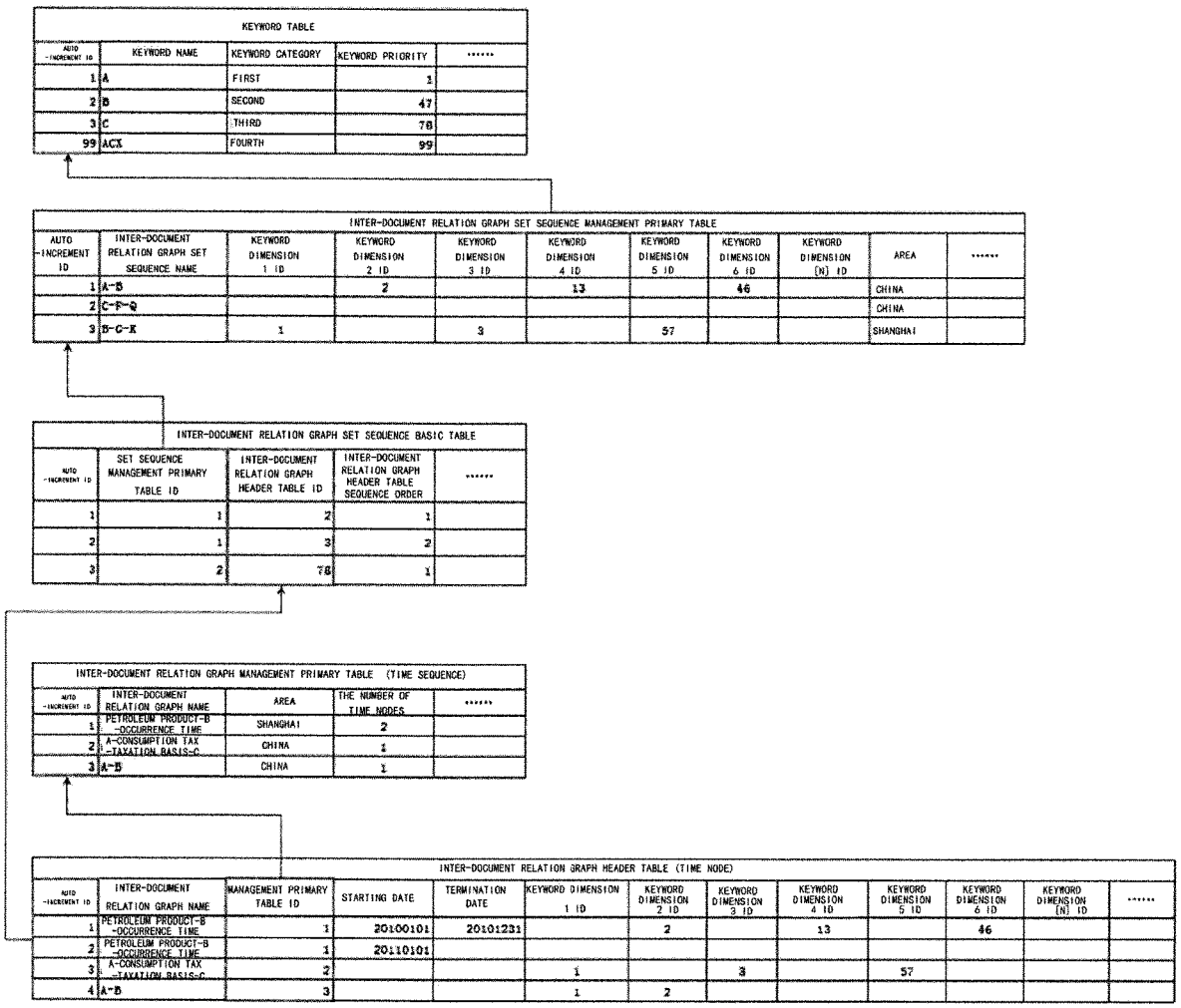
Figure 8:
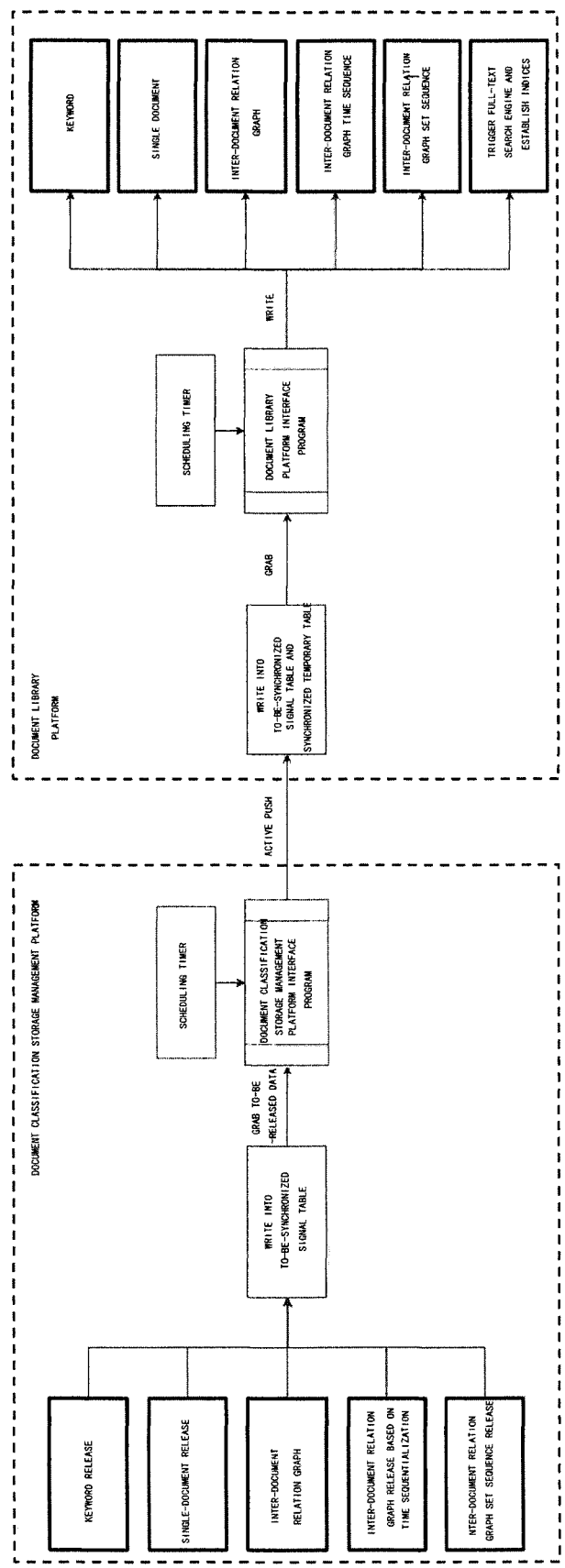
Figure 9:
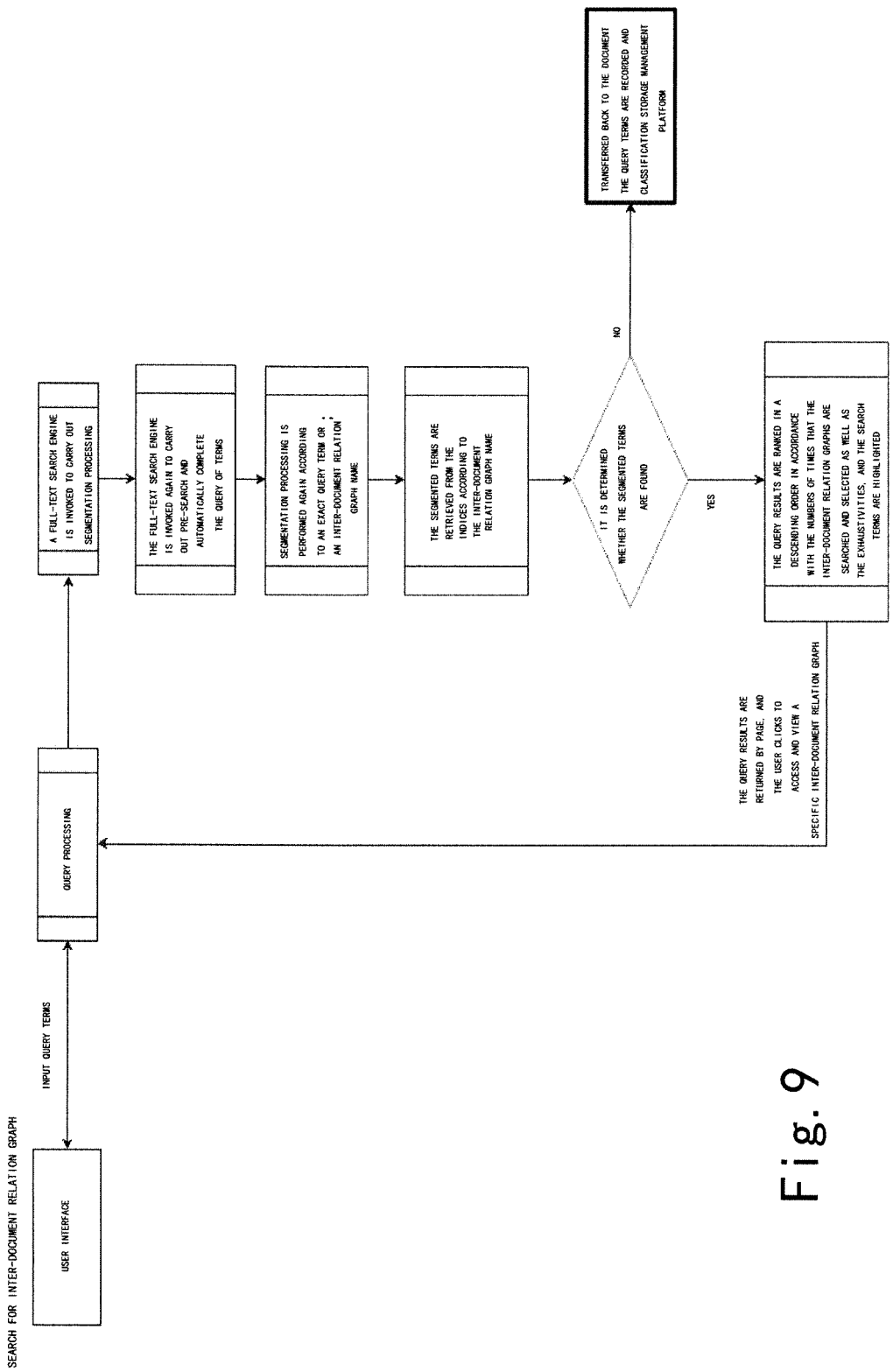
Figure 10:
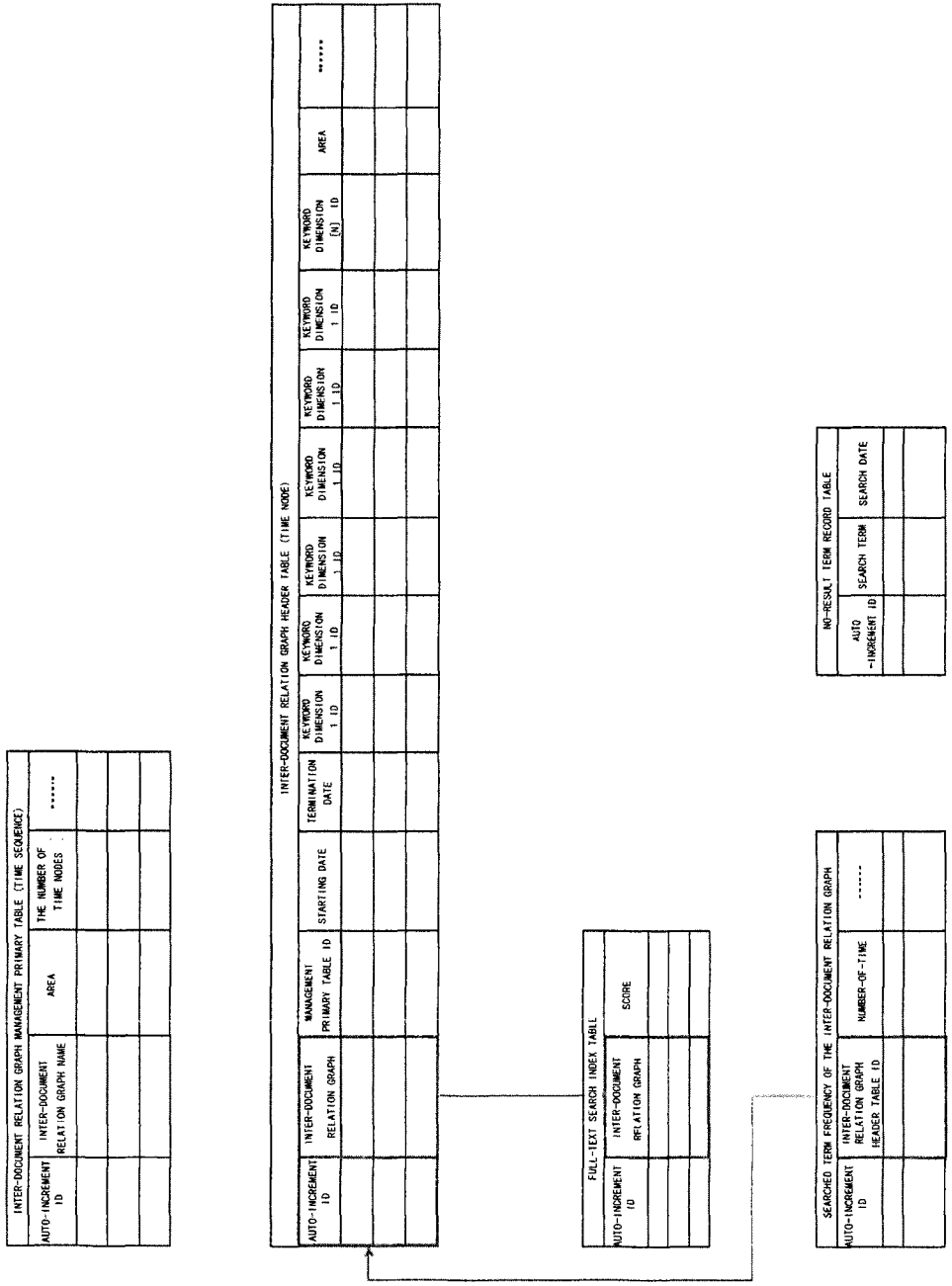
Figure 11:
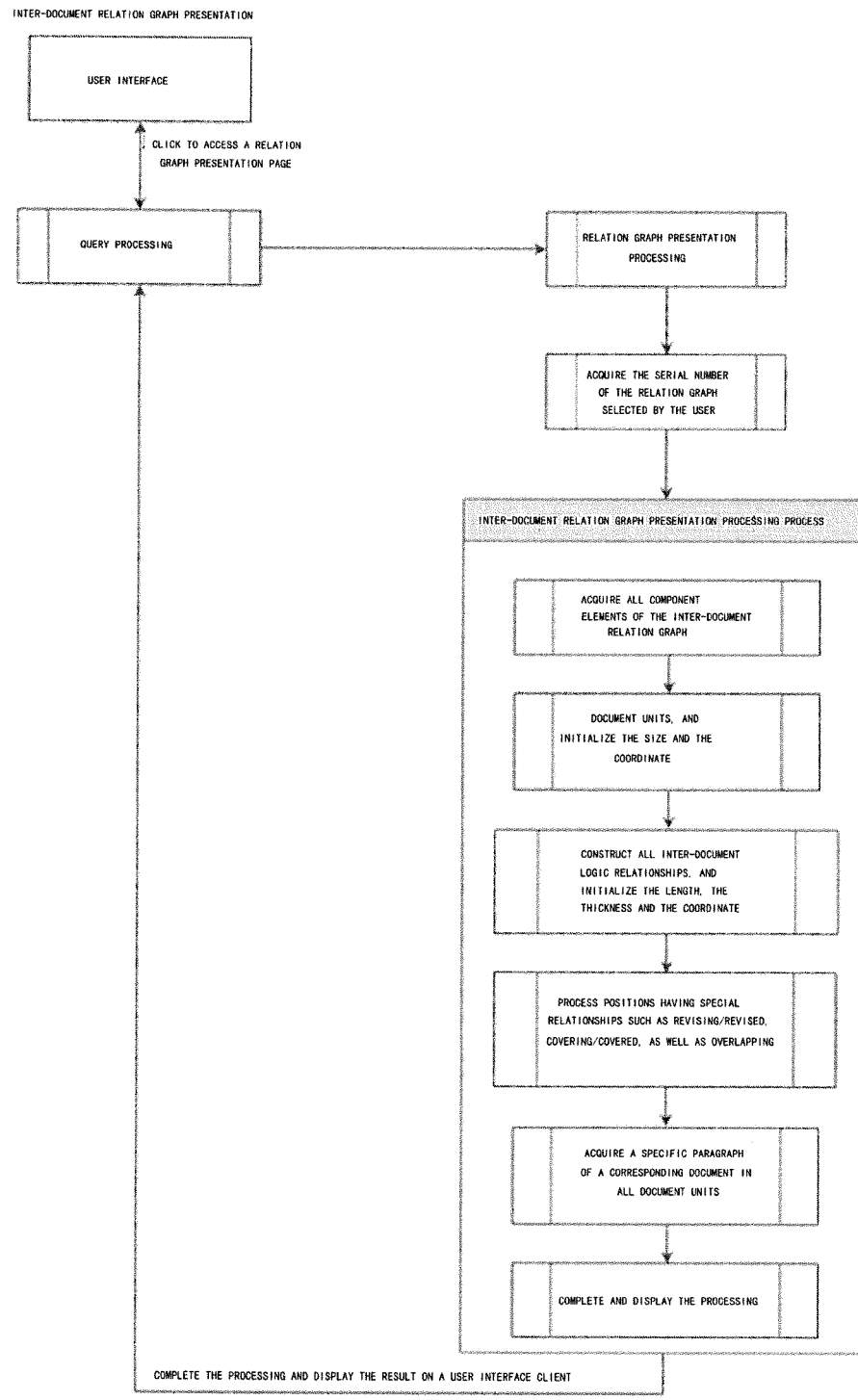
Figure 12:
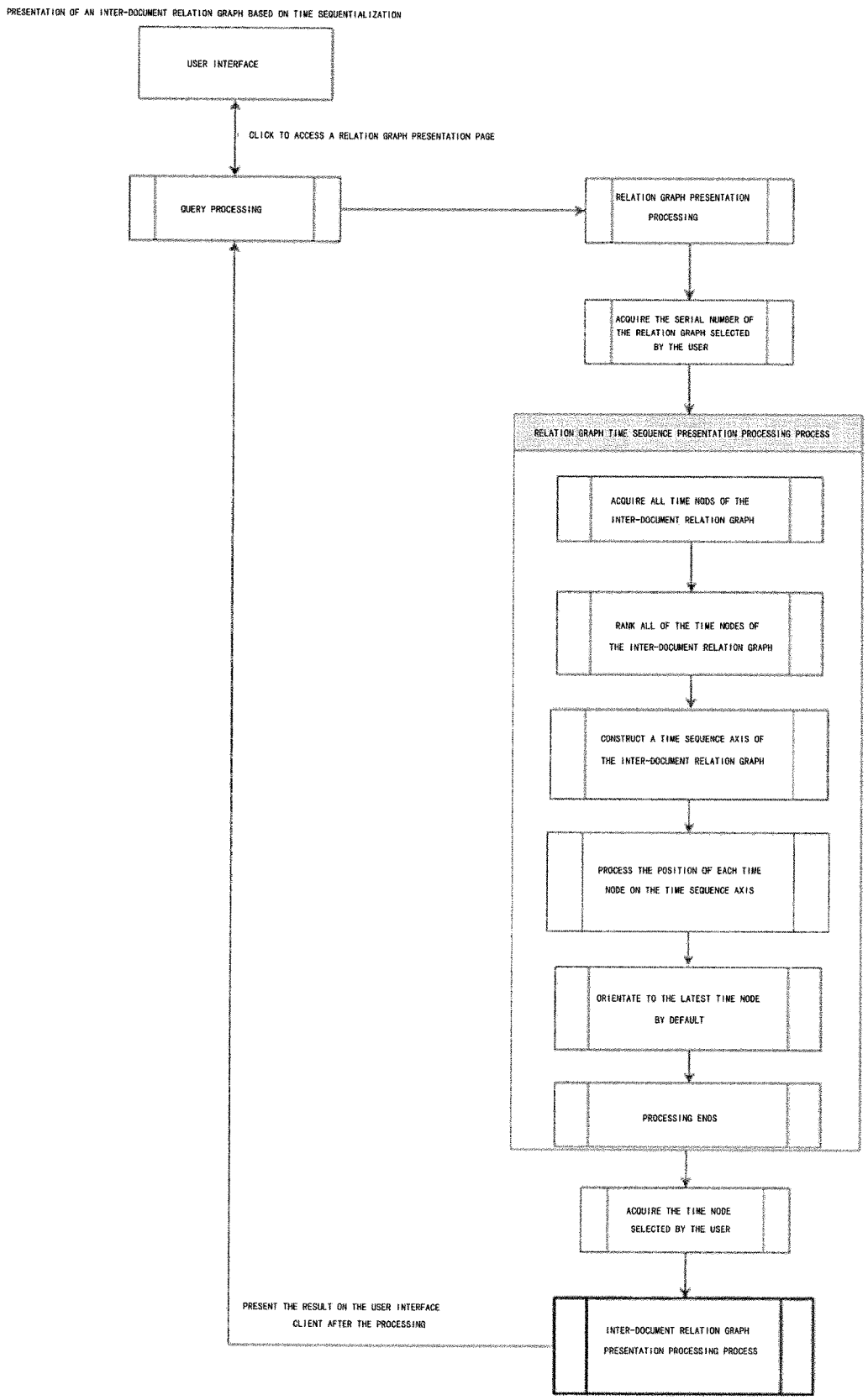
Figure 13:
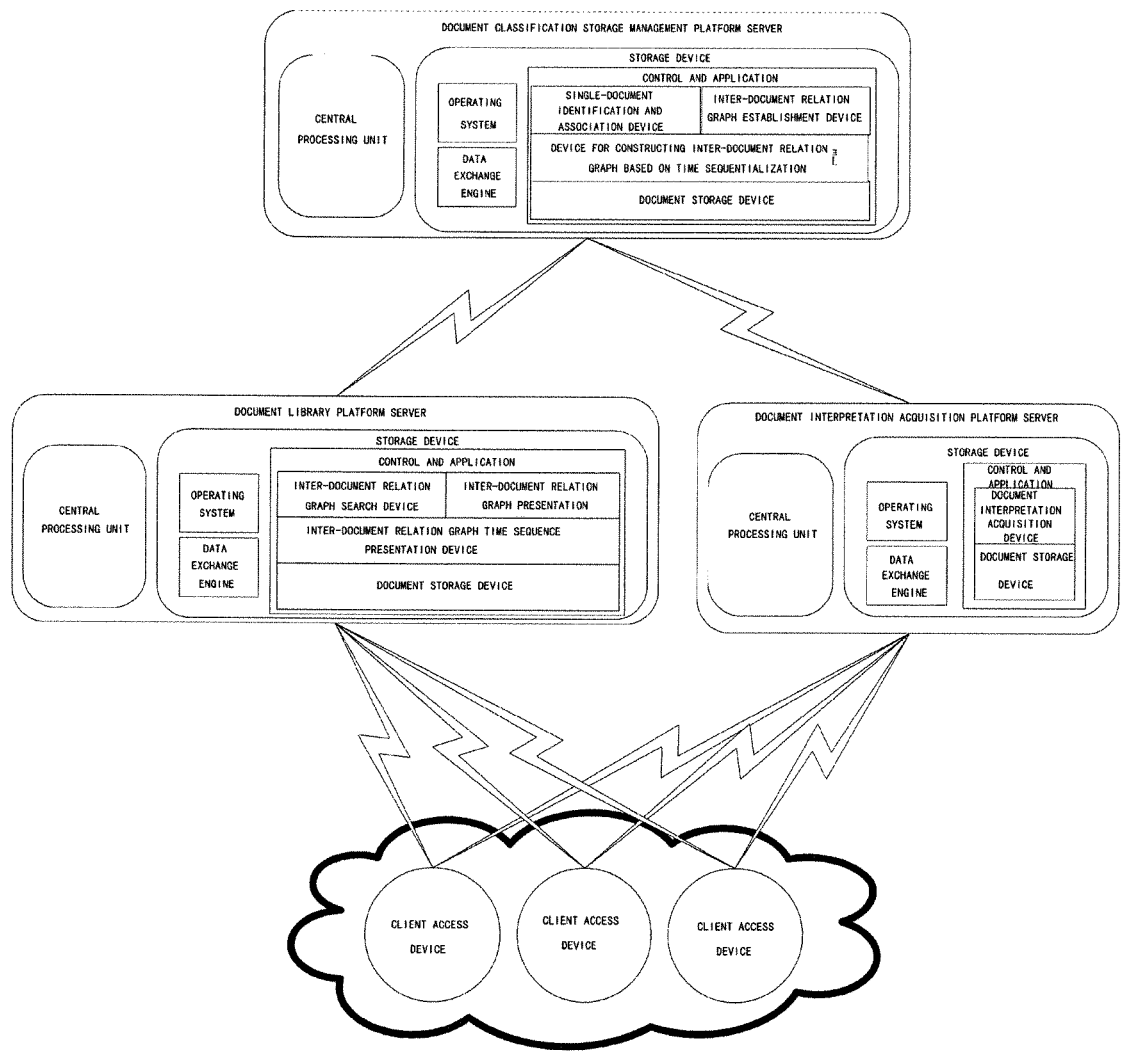
Figure 14:
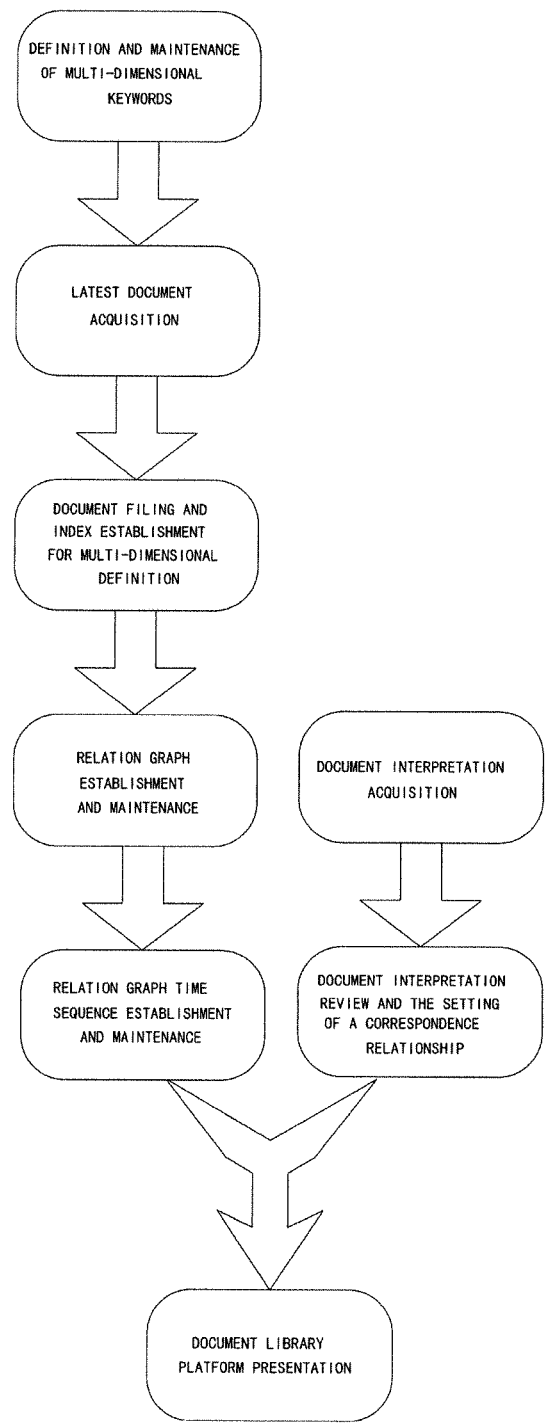
Figure 15:
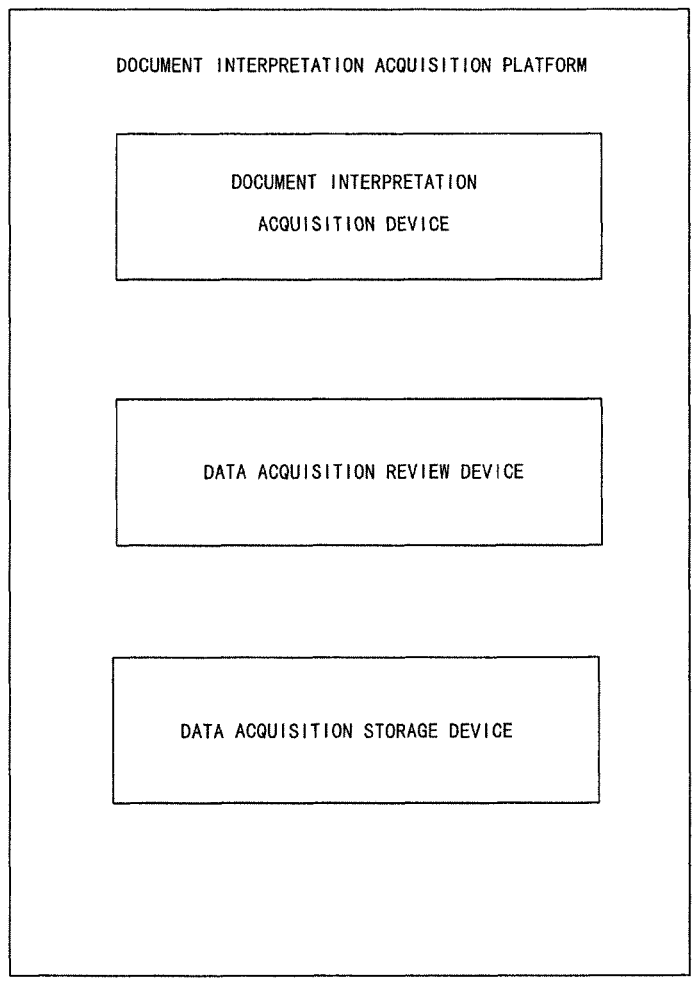

FIGS. 6(a) and 6(b) are illustrations of the implementation principles corresponding to a single-document identification and association device and an inter-document relation graph establishment device of the present invention at a database level;

FIG. 7 illustrates a diagram of the implementation principle of an inter-document relation graph set sequence construction device in the present invention at a database level;

FIG. 8 is a block diagram of the implementation of a data flow part between the document classification storage management platform and the document library platform in the present invention;

FIG. 9 is a block diagram of the implementation principle of the search for an inter-document relation graph in the present invention;

FIG. 10 is a diagram of the implementation principle of an inter-document relation graph search device in the present invention at a database level;

FIG. 11 is a block diagram of the implementation principle of the presentation of an inter-document relation graph in the present invention;

FIG. 12 is an illustration of the implementation principle of the presentation of an inter-document relation graph set sequence in the present invention;

FIG. 13 is a block diagram of another embodiment on the basis of the system for identifying, associating, searching and presenting documents based on relation combination shown in FIG. 1 in the present invention;

FIG. 14 is a flow chart for the system running of the embodiment shown in FIG. 13; and FIG. 15 illustrates a detailed structure diagram of a document interpretation acquisition platform server.

DETAILED DESCRIPTION

The present invention will be further described below in conjunction with the accompanying drawings and embodiments.

The Embodiment of the System for Identifying, Associating, Searching and Presenting Documents Based on Relation Combination (Online Version)

FIG. 1 illustrates a structure of a system for identifying, associating, searching and presenting documents based on relation combination according to a preferred embodiment of the present invention. The system is not only applicable to online documents, but also applicable to stand-alone documents (including those in hand-held apparatuses). The embodiments of the present invention will be described by taking online documents as an example, and the application of stand-alone documents is similar, where the only difference lies in the change into a stand-alone version, which is well-known to a person skilled in the art. Referring to FIG. 1, the system according to the present embodiment includes a document classification storage management platform server 10, a document library platform server 12 and client access devices 14. The number of client access devices 14 is not limited, which can be three as shown in FIG. 1, i.e., client access devices 140, 142 and 144.

In addition to a common central processing unit, an operating system and data exchange engine, the document classification storage management platform server 10 also includes control and application parts, such as a single-document identification and association device 100, an inter-document relation graph establishment device 102, an inter-document relation graph set sequence construction device 104, and primary nodes 106 of a document storage device which are deployed on the document classification storage management platform server 10.

In addition to a common central processing unit, an operating system and data exchange engine, the document library platform server 12 also includes control and application parts, such as an inter-document relation graph search device 120, an inter-document relation graph presentation device 122, an inter-document relation graph set sequence presentation device 124, and mirrored versions 126 of the primary nodes of the document storage device which are deployed on the document library platform server.

Figure 3:
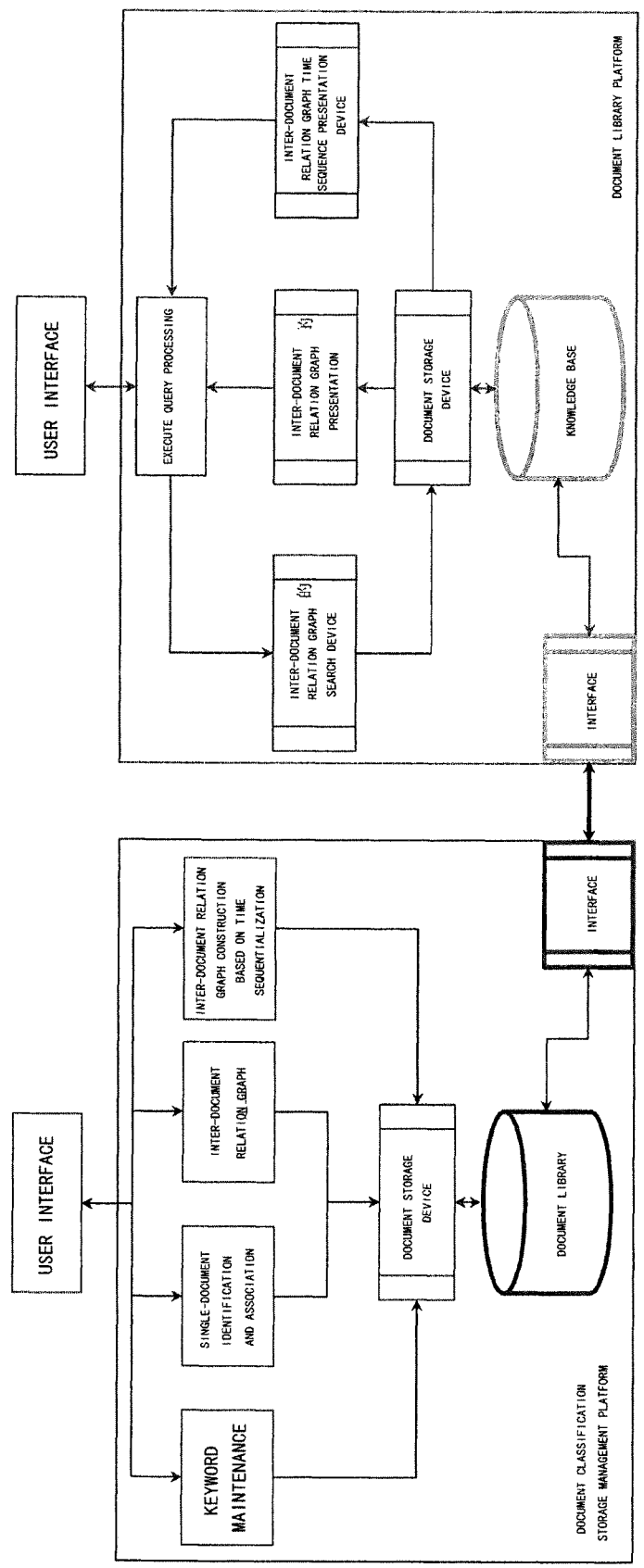
FIG. 3 illustrates a block diagram of an exemplary method for operating the system illustrated in FIG. 1 and for searching and presenting documents of the present invention.

FIG. 3 illustrates an exemplary method of operating the system of FIG. 1 and for searching and presenting documents of the present invention. The following descriptions of various devices and modules of the present embodiment are all implemented on the basis of the method shown in FIG. 3.

The single-document identification and association device 100, as one of the important elements of the present invention, is deployed on the document classification storage management platform server 10. It mainly provides the following functions: 1, classifying and defining preset professional terms in accordance with different dimensions, and establishing and maintaining a list of keywords in a related professional field; 2, defining a single document in accordance with different attributes, wherein these relevant attributes may become query conditions of the system; 3, setting several document units in the single document; 4, defining a list of logical relationships that may be developed between any two single documents or document units; and 5, associating logical relationship between any two single documents based on a set logical relationship category.

Figure 2A:
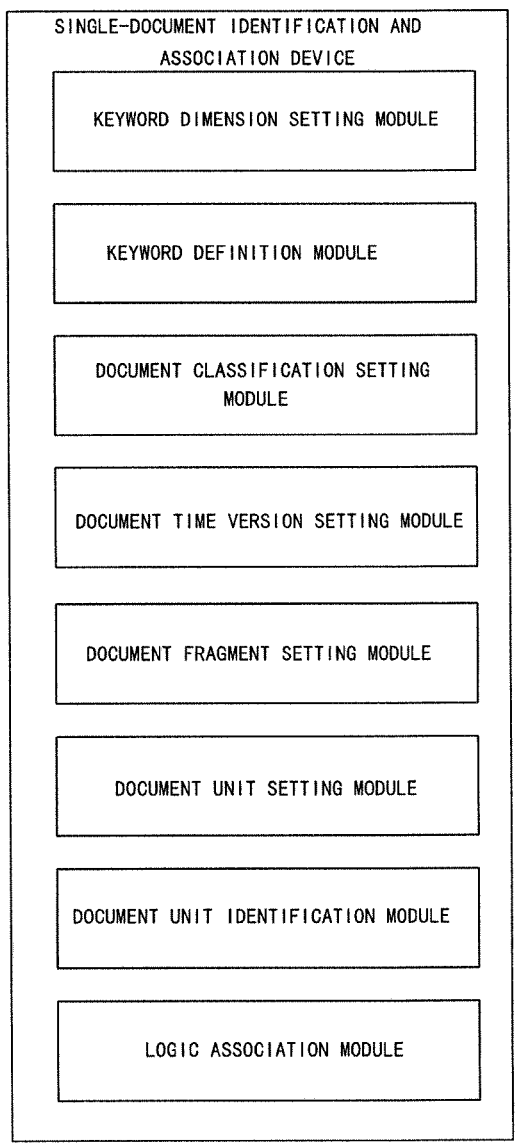

FIG. 2A illustrates the internal structure of the single-document identification and association device 100. Referring to FIG. 2A, the single-document identification and association device 100 includes a keyword dimension setting module, a keyword definition module, a document unit identification module, a document classification setting module and a document fragment setting module.

In addition, the single-document identification and association device 100 further includes a document unit setting module and a logic association module. The document unit setting module combines document fragments of the single document having the same keyword identification into several document units. The logic association module defines the list of logical relationships that may be developed between any two single documents, and associates logical relationship between two single documents or document units in the system by means of the set logical relationship category.

The keyword dimension setting module sets keyword dimensions. The keyword definition module is coupled to the keyword dimension setting module, and defines keywords corresponding to various keyword dimensions. The document unit identification module performs the system identification on the document units with several keywords. The document classification setting module performs classification setting on the single document based on the keywords. The document fragment setting module performs classification setting on various document fragments of the document based on the keywords.

While attribute identification is performed on the single document, a keyword classification architecture of multiple dimensions is established. Keywords are used to divide the document from all-around perspectives. The detailed method includes: respectively identifying a group of keywords for each document fragment of the document; defining document fragments which contain keywords having similar meanings and close concepts in the same document as a plurality of document units from different dimensions; setting logical relationships among these document units in accordance with the idea of categorization, deconstruction and construction; and performing identification by setting one dedicated icon for each kind of logical relationship, wherein the most fundamental presentation image formed is called inter-document relation graph presentation. For example, a derivative relationship indicates that document B is composed in accordance with a certain document fragment of document A. A parallel relationship indicates that two or more documents composed jointly on the basis of a certain document fragment of document A are parallel documents. When the parallel documents are set, a document having an earlier release time is on the left and a document having a later release time is on the right.

An inter-document relation graph generally consists of no less than 2 keywords which are selected from several keywords having different dimensions and respectively defined according to different professional fields.

After receiving a command from an operator for identifying and associating a single document, the single-document identification and association device 100 executes corresponding operations and interacts with the user. FIGS. 6(a) and 6(b) illustrate the relationship among internal database tables.

Figure 4:
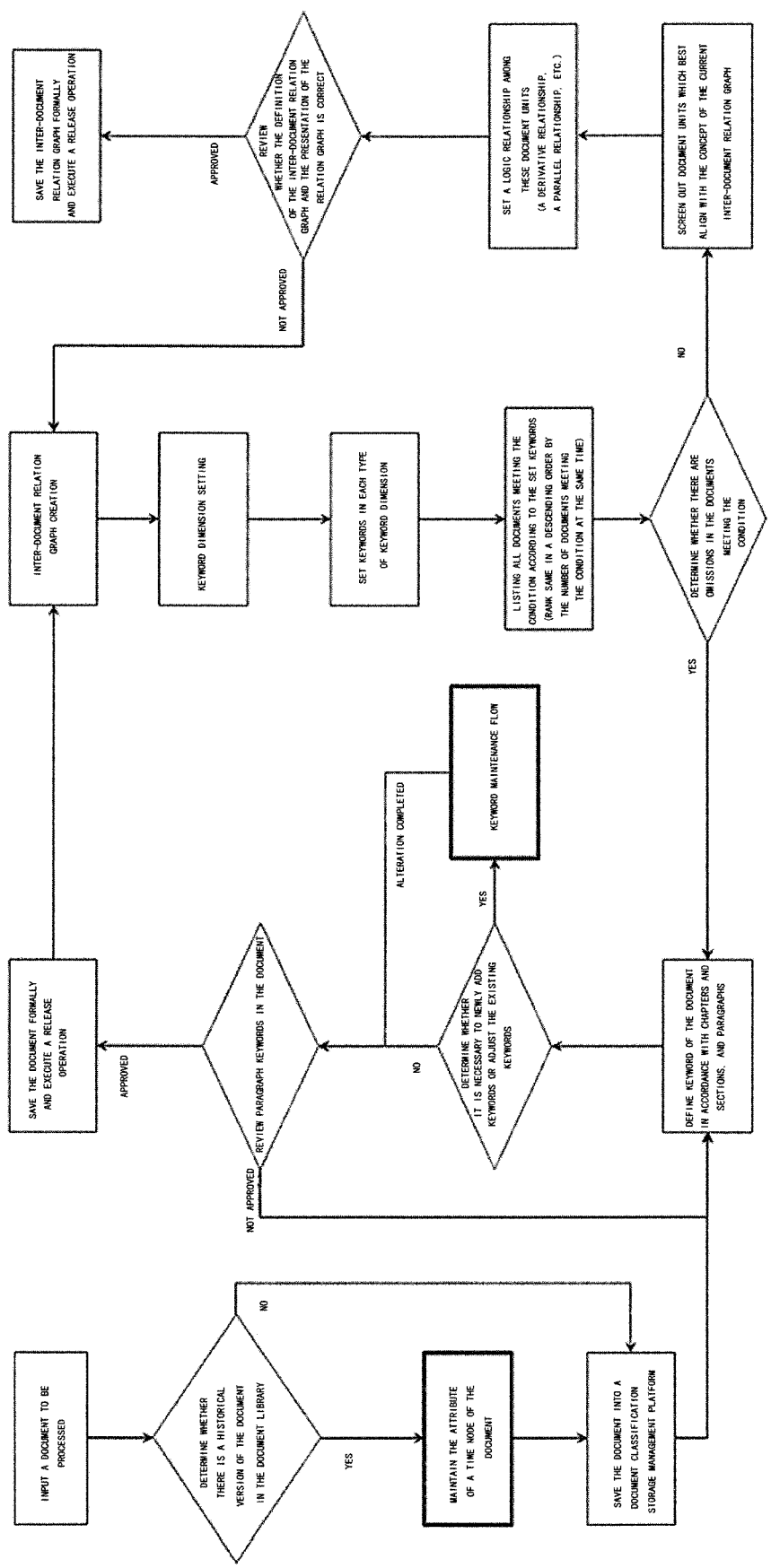
FIG. 4 illustrates a block diagram of document identification and inter-document relation graph definition according to the present invention.

The internal workflow of the single-document identification and association device is shown in the first and second columns of FIG. 4. A knowledge base is provided containing at least one data structure (a keyword table, a document information underlying table, a document full-text content table, a document full-text keyword table, a document paragraph content table and a document paragraph keyword table) for associating keyword data with document data and document fragment data.

The system functions to sett keyword dimensions, corresponding to a keyword category field in the keyword table of the database. The system functions to edit details of the keywords for ascertained keyword dimensions, including but not limited to, edit attributes such as keyword name and keyword dimension (category), and initiate a keyword definition procedure.

The system functions to review the necessities of the submitted keywords and the attribute settings thereof. If the review is not approved, returning back to the step of editing details of the keyword; and if the review is approved, saving the data to the keyword table of the database.

The system functions to respectively define corresponding keywords for the document by document fragments. As such, the data is saved into the document paragraph content table and the document paragraph keyword table. In a document fragment, an underlying table ID field of the document paragraph content table is an external key of an auto-increment ID field of the document information underlying table, a paragraph table ID of the document paragraph keyword table is an external key of an auto-increment ID field of the document paragraph content table, and a keyword ID field is an external key of an auto-increment ID field of the keyword table.

The system functions to formally save the document into the document classification storage management platform database and the document library, and perform a release operation.

The above-mentioned operations of writing into the database and the document library are both implemented by invoking the document storage device 106 ultimately.

The inter-document relation graph establishment device 102 is deployed on the document classification storage management platform server 10, and it defines an inter-document relation graph and defines relationships among elements of the inter-document relation graph.

Figure 2B:
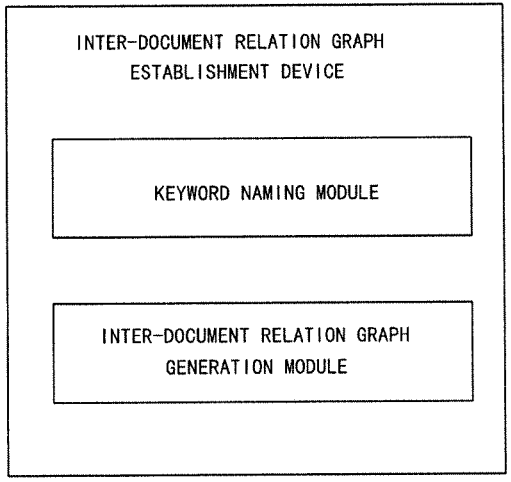
Figure 2C:
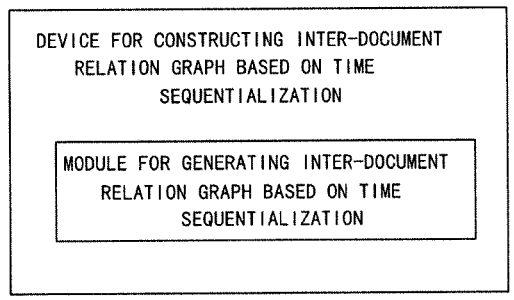

As shown in FIG. 2B, the inter-document relation graph establishment device 102 includes a keyword naming module and an inter-document relation graph generation module. The keyword naming module names any specific inter-document relation graph with a specific group of keywords. The inter-document relation graph generation module is used for generating the inter-document relation graph by presenting a relevant document unit cluster in the inter-document relation graph, presenting graphical identification of the logical relationship among the document units, and presenting a single document unit.

After receiving a command for establishing an inter-document relation graph from the operator, the inter-document relation graph establishment device performs corresponding operations and interacts with the user. FIG. 4 illustrate the procedure and FIGS. 6(a) and 6(b) illustrate an inter-database table relationship.

A knowledge base is provided containing at least one data structure (a keyword table, a document information underlying table, a document full-text content table, a document full-text keyword table, a document paragraph content table, a document paragraph keyword table, an inter-document relation graph management primary table, an inter-document relation graph header table, an inter-document relation graph basic table and an inter-document relation graph corresponding paragraph table) for associating keyword data and document data, inter-document relation graph data.

The system provides a set of complete functions of creation and maintenance procedures for the inter-document relation graph. The system functions to define keyword dimensions involved in the current inter-document relation graph, and also define specific keywords which need correspondence in the involved keyword dimensions. The data is saved into the inter-document relation graph management primary table and the inter-document relation graph header table, wherein a keyword dimension 1 ID—a keyword dimension [N] ID are respectively external keys of auto-increment ID fields of the keyword table, and a management primary table ID is an external key of an auto-increment ID field of the inter-document relation graph management primary table.

The system will list all documents meeting the conditions according to set keywords, and rank the documents in a descending order at the same time.

The system functions to list document units which best align with the concept of the current inter-document relation graph screened out from all of the documents meeting the conditions. Inter-document logical relationships of a certain specific professional field can be classified into N types (N is a natural number) of logical relationships, such as a derivative relationship (i.e. B is derived from A), a parallel relationship/AND relationship (i.e. A is parallel with B), an OR relationship (i.e. A and B both hold), a containment relationship (i.e. A contains B), a revision relationship (i.e. B revises part of the expression and content of A), a coverage relationship (the content of B totally contains A, but is obviously more complete than A, and B, instead of A, is widely accepted in the industry, then A is covered by B), and a negation relationship (A is opposite to B).

By way of example, textbook A is divided into 10 chapters, each chapter being divided into 10 sections. Chapters 4 and 5 respectively explain two different attributes of the same thing, thus having a parallel relationship. Chapter 1 has a containment relationship with section 2, chapter 1, i.e. chapter 1 contains section 2, chapter 1. Section 3, chapter 8 and section 4, chapter 8 both set out two opposite theoretical assumptions of the same thing neither of which is verified: if the former is valid, the latter is invalid, or vice versa, that is, the two have a negation relationship. Section 7, chapter 9 and section 8, chapter 9 both set out two parallel theoretical assumptions of the same thing neither of which is verified: the former being valid is not necessarily related to the latter being valid, that is, the two has an OR relationship. Chapter X in textbook B is the interpretation for chapter 5 in textbook A, then the former and the latter have a derivative relationship.

Here, the system will endow each inter-document logical relationship with unique graphical identification, and uses the specific identification as identification for the logical relationship between two document units during presentation, so that the system user can directly understand and recognize the same.

Each single document can be decomposed into several document fragments, wherein each document fragment can be defined as a document unit. Any document in a certain professional field inevitably has one or more attributes of professional term of the field, wherein this professional term can be defined as a keyword corresponding to the document unit document fragment in the form of computer system assignment.

By way of example, document fragments X and Y has a parallel relationship: keywords corresponding to document fragment X are A, B, C and D, and keywords corresponding to document fragment Y are B, C, D and E, when a search is carried out with a keyword B-C-D, the result displayed by the system is B-C-D.

Each selected document unit will be embodied in the form of a record in the inter-document relation graph basic table, wherein a knowledge point header table ID field is an external key of an auto-increment ID field of the inter-document relation graph header table, a document underlying table ID is an external key of an auto-increment ID field of the document information underlying table, and an element ID field is generated automatically according to rules. The rules are detailed as follows:

a document unit: "PF_"+a number converted from a time stamp when an element is selected;

a derivative relationship: "PL_"+a number converted from a time stamp when an element is selected;

a parallel relationship: "PE_"+a number converted from a time stamp when an element is selected;

a revision relationship: "PM_"+a number converted from a time stamp when an element is selected;

a coverage relationship: "PN_"+a number converted from a time stamp when an element is selected;

a containment relationship: "PQ_"+a number converted from a time stamp when an element is selected; and a negation relationship: "PT_"+a number converted from a time stamp when an element is selected.

Meanwhile, paragraph numbers corresponding to the selected document units need to be filled into a sub-table, i.e. the inter-document relation graph corresponding paragraph table, wherein an inter-document relation graph basic table ID field is an external key of an auto-increment ID field of the inter-document relation graph basic table, and a paragraph sequence number field is an external key of a paragraph order number field.

The system functions to lay out the screened-out document units while setting a logical relationship among these document units, wherein this logical relationship includes but is not merely limited to a derivative relationship, a parallel relationship, a revision relationship, a coverage relationship, a containment relationship and a negation relationship.

The implementation method includes firstly, adding document units having a required connection relationship to a design region, and adjusting the coordinate positions; then adding the relationship needing to be designed to the design region, wherein the system will draw the relation graphical effect in real time, and can adjust details such as the position, size and thickness of a relationship element according to the dragging and movement by the user; and respectively setting document unit elements coupled to the two ends of the relationship element, wherein the two ends of the relationship element can only select document unit elements, and the document unit elements can only be coupled by the relationship element.

Taking the derivative relationship as an example, in the inter-document relation graph basic table, a derivative relationship element needs to respectively set its upper element ID and lower element ID. With regard to two document units that are selected by the upper element ID and the lower element ID at the same time, a lower element ID and a corresponding upper element ID also need to be updated in this table. With regard to a document unit corresponding to the upper element ID, a lower element entity ID to which it skips the relationship element and gets directly coupled needs to be set. With regard to a document unit corresponding to the lower element ID, an upper element entity ID to which it skips the relationship element and gets directly coupled needs to be set. The upper element ID, the lower element ID, the upper element entity ID and the lower element entity ID here are all external keys of the element ID field in the inter-document relation graph basic table.

Other relationships such as the parallel relationship, the revision relationship, the coverage relationship, the containment relationship and the negation relationship are all processed by means of the same processing method as that for the derivative relationship.

Meanwhile, with regard to the document unit, an element start X-coordinate and an element start Y-coordinate thereof on the design region need to be recorded in the inter-document relation graph basic table, with an upper left corner of the design region being a (0, 0) point.

Meanwhile, with regard to each relationship element, an element start X-coordinate, an element start Y-coordinate, an element end X-coordinate and an element end Y-coordinate thereof on the design region as well as line picture flow data need to be recorded in the inter-document relation graph basic table, with the upper left corner of the design region being a (0, 0) point.

The line picture flow data is formed by converting the finalized details such as the size and the thickness of the relationship element on the design region into a very common vector diagram png picture format and then converting same into binary picture flow data and storing same in the database.

The system functions to review the submitted inter-document relation graph and determines whether the definition of the inter-document relation graph and the setting of the logical relationship among document units are correct. If the review is not approved, returning to re-execute the step of creating the inter-document relation graph; otherwise, if the review is approved, continuing with the subsequent processing.

The system functions to formally save the inter-document relation graph into the document classification storage management platform database and the document library, and perform a release operation.

The above-mentioned operations of writing into the database and the document library are both implemented by invoking the document storage device 106 ultimately.

Figure 5:
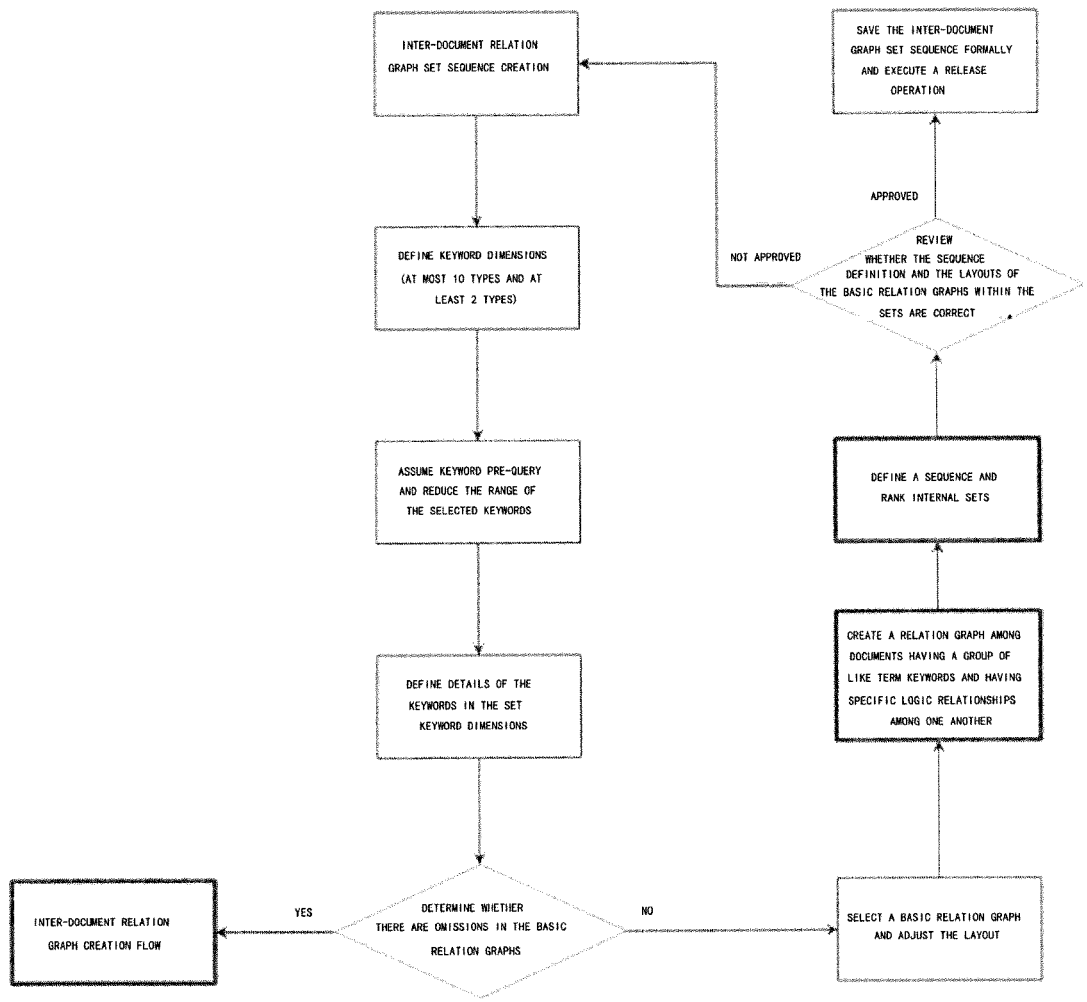
FIG. 5 illustrates a block diagram of the construction of an inter-document relation graph set sequence in the present invention.

After receiving a command for creating an inter-document relation graph set sequence from the operator, the inter-document relation graph set sequence construction device 104 executes relevant operations and interacts with the user. FIG. 5 illustrates the procedure and FIG. 7 illustrates an inter-database table relationship.

A knowledge base is provided containing at least one data structure (a keyword table, an inter-document relation graph management primary table, an inter-document relation graph header table, an inter-document relation graph set sequence management primary table and an inter-document relation graph set sequence basic table) for associating keyword data and inter-document relation graph data, inter-document relation graph set sequence data.

The system provides a set of complete functions of creation and maintenance procedures for the inter-document relation graph set sequence. The system operator can create the set sequence as required, define the keyword dimension of the set and perform pre-search according to the assumed keyword dimension, define specific keywords in the set keyword dimension, determine whether there are omissions in a basic relation graph, and if so, executes the inter-document relation graph creation flow again until the relation graph is completed, and meanwhile, the operator selects the basic relation graph and adjusts the layout, implements, by means of iteration, the creation of a plurality of visualized inter-document relation graph sets of which the names have a group of like term keywords and which have a specific logical relationship among one another, and defines the set sequence and rank various internal sets in accordance with a certain logical relationship. The data is saved into the inter-document relation graph set sequence management primary table and the inter-document relation graph set sequence basic table, wherein a set sequence management primary table ID is an external key of an auto-increment ID field of the inter-document relation graph set sequence management primary table.

The system functions to review the submitted inter-document relation graph set sequence and determine whether the definition of the inter-document relation graph set sequence and the layout of the basic relation graph in each set are correct. If they are not correct, returning to re-execute the step of creating the inter-document relation graph set sequence; otherwise, if the review is approved, continuing with the subsequent processing.

The system functions to formally save the inter-document relation graph set sequence into the document classification storage management platform database and the document library, and perform a release operation.

The above-mentioned operations of writing into the database and the document library are both implemented by invoking the document storage device 106 ultimately.

The primary nodes of the document storage device are deployed on the document classification storage management platform server, whereas the mirrored versions of the primary nodes are deployed on the document library platform. The document storage device stores relevant information in a database of the document classification storage management platform server according to the invocation of the single-document identification and association device, the inter-document relation graph establishment device and the inter-document relation graph set sequence construction device, archives files in a specified format to the document library platform server, and transfers relevant data information between the document classification storage management platform server and the document library platform server via a data exchange engine.

As shown in FIG. 2D, the document storage device includes a relational database management system, a document library management system, a write operation module, a save operation module and a platform data transmission module. The relational database management system is used for establishing a document classification storage management platform. The document library management system is used for establishing a document library platform. The write operation module performs write operations on a database when the devices are invoked. The save operation module archives to save corresponding single-document files or inter-document relation graph files when the devices are invoked. The platform data transmission module transfers relevant data between the document classification storage management platform server and the document library platform server via the data exchange engine.

After receiving requests from other devices, the document storage device performs interactive methods for database storage and document library archiving.

Referring to FIG. 8, the document storage device provides a knowledge base containing at least one data structure for associating all platforms and all data of the present system. At least one document library is provided and contained which can be configured to archive files in specified formats by version. At least one set of complete database invoking interfaces are provided and contained, for on-demand use by the single-document identification and association device, the inter-document relation graph establishment device, the inter-document relation graph set sequence construction device, the inter-document relation graph search device, the inter-document relation graph presentation device and the inter-document relation graph set sequence presentation device. At least one set of complete document library invoking interfaces are provided and contained, for use by the single-document identification and association device 100 to archive and update the files in the specified format.

At least one set of complete data synchronization mechanisms are provided and contained, and the data exchange engine is invoked such that appropriate data can be communicated in time between the document classification storage management platform and the document library platform.

The document classification storage management platform server interacts and transfers data with the document library platform server via an interface program. For detailed implementation, please refer to FIG. 8. It writes data needing to be sent into a to-be-synchronized signal table and a relevant temporary table of the document library platform by means of remote write, and then relevant subsequent processing is carried out by the interface program of the document library platform. Meanwhile, it will also depend on and actively grab data in a to-be-transferred-back signal table and a synchronized temporary table in the document library platform.

When various release operations, including but not limited to keyword release, single-document release, inter-document relation graph release, inter-document relation graph set sequence release, etc., are executed on the document classification storage management platform server, a to-be-synchronized signal is firstly written into the temporary table, so as to perform subsequent relevant processing when an interface program cyclical execution cycle starts.

A scheduling timer on the document classification storage management platform server cyclically executes the interface program regularly according to a set time-step vector, and is provided with an intelligent recovery function once a failure occurs to accomplish data transfer work within a time-step vector due to the interface program, or an abnormality occurs due to the interface program.

The document library platform server acquires the data transferred from the document classification storage management platform server 10 by means of the interface program. For detailed implementation, please refer to FIG. 8. Update is performed on data in a target database according to relevant data in the to-be-synchronized signal table and the synchronized temporary table which are pushed actively to the present platform by the interface program of the document classification storage management platform server 10. Meanwhile, data generated by operations of the present platform, including but not limited to user behaviour information, etc., is grabbed and then written into the to-be-transferred-back signal table and the synchronized temporary table, so that the interface program of the document classification storage management platform carries out subsequent processing.

When receiving data such as an inter-document relation graph by means of the interface program, the document library platform server will trigger a function for a full-text search engine to re-establish an index.

The inter-document relation graph search device establishes an inter-document relation graph index having an auto-maintenance function, and performs a full-text retrieval for an inter-document relation graph according to one or more query terms input at one time. The inter-document relation graph search device includes an index establishment module and a keyword retrieval module as shown in FIG. 2E.

The index establishment module establishes a set of inter-document relation graph indices having an auto-maintenance function. The keyword retrieval module performs a full-text retrieval for the inter-document relation graph according to one or more query terms input by a user at one time.

The inter-document relation graph search device which is deployed on the document library platform server executes a data retrieval in accordance with established rules after receiving a request from an end user. The running procedure is as shown in FIG. 9, and an inter-database table relation graph is as shown in FIG. 10.

The system provides a knowledge base containing at least one set of data structures for establishing combined indices for the inter-document relation graph and query condition elements. When there is relevant information about the inter-document relation graph being synchronously updated in the database, the system will automatically update a full-text search index table which is established jointly by inter-document relation graph name fields and is specifically established for queries of inter-document relation graphs. For the inter-database table relation graph, please refer to FIG. 10.

When the user uses the full-text retrieval for the inter-document relation graph, the system firstly invokes a segmentation component in the full-text search engine to carry out segmentation processing. The full-text search engine is invoked again to carry out pre-search and automatically complete the query of terms, carry out a retrieval from an inter-document relation graph name column for one or more query terms input by the user at one time, and rank same in a descending order in accordance with the numbers of times (according to a number-of-time field of a searched term frequency of the inter-document relation graph, wherein an inter-document relation graph header table ID field of this table is an external key of an auto-increment ID field of the inter-document relation graph header table) that the inter-document relation graphs are queried and invoked in an automatic completion list provided according to the automatic completion of progressive entering by the user.

According to an exact query term or a specific inter-document relation graph name selected from the automatic completion list, the system invokes the segmentation component in the full-text search engine again to perform segmentation processing. The segmented terms are retrieved from the full-text search index table according to the inter-document relation graph name. The system determines whether a relevant result is found, if not, a function of recording the query term will be executed, otherwise, subsequent processing will be continued.

The system will record this query term (writing same into a no-result term record list), and invokes the data exchange engine via the document storage device to transfer the data back to the document classification storage management platform.

After being ordered in a descending order in accordance with the numbers of times that the inter-document relation graphs are searched and selected as well as the exhaustivities, the retrieved query results are returned by page, and the user clicks to access and view a certain specific inter-document relation graph. In addition, the search terms are highlighted.

The inter-document relation graph presentation device presents the inter-document relation graph, separately presents a certain document unit in the inter-document relation graph and presents full text of a single document corresponding to the certain document unit in the inter-document relation graph. The inter-document relation graph presentation device comprises the inter-document relation graph presentation module, the document unit presentation module and the single-document presentation module as shown in FIG. 2F. The inter-document relation graph presentation module presents a specified inter-document relation graph according to a search result of the user. The document unit presentation module presents a certain document unit in the specified inter-document relation graph according to the search result of the user. The single-document presentation module presents full text of a single document corresponding to the certain document unit in the specified inter-document relation graph according to the search result of the user.

The inter-document relation graph presentation device is deployed on the document library platform server 12.

FIG. 11 shows an interactive method of presenting information in accordance with established rules by the inter-document relation graph presentation device after a request from an end user is received, and the specific description will be given below.

The system provides a knowledge base containing at least one set of complete document full-text information and complete inter-document relation graph information data structures.

The system performs a retrieval operation on the auto-increment ID of the selected inter-document relation graph from the inter-document relation graph header table according to the selection of the end user, and executes a function of presenting the inter-document relation graph. For the inter-database table relation graph, please refer to FIGS. 6(*a*) and 6(*b*).

The presentation processing process for the inter-document relation graph includes: acquiring all component elements of the inter-document relation graph and relevant attributes thereof from the inter-document relation graph basic table according to the serial number of this inter-document relation graph; constructing all document units, and initializing the widths and heights of the document units and performing coordinate positioning; constructing a logical relationship among all of the document units, and initializing the lengths, heights and widths of these logical relationship lines and performing coordinate positioning; and converting binary data in a line picture flow data field in the inter-document relation graph basic table of the database into a picture file in a png format and displaying same on the image.

The processing is carried out on, including but is not limited to: positions having special relationships such as revising/revised, covering/covered, as well as an overlapping attribute of the document units. When two certain document units are coupled by a special element such as a revision relationship element or a coverage relationship element, the connecting document unit will be placed on an upper layer while the coupled document unit will be placed on a lower layer. For example, as to a coverage relationship, A covers B, then document unit A will be placed on the upper layer, and document unit B will be placed on a lower layer of document unit A, the two document units being in an overlapping display mode.

The content of a specific document fragment of a corresponding document in all document fragments is acquired, all paragraph content records corresponding to this document unit are acquired from a document paragraph content table according to a document underlying table ID field of the inter-document relation graph basic table+a paragraph serial number field of a paragraph table corresponding to the inter-document relation graph, and the paragraph serial numbers are arranged side by side and ordered in an ascending order.

So far, the inter-document relation graph presentation processing is completed, and the processing result is returned and displayed.

According to the selection of the end user, the selected document unit is transferred to the system for separate presentation of the document unit.

According to the selected document unit, all paragraph content records corresponding to this document unit are acquired from a document paragraph content table according to a document underlying table ID field of the inter-document relation graph basic table+a paragraph serial number field of a paragraph table corresponding to the inter-document relation graph, and the paragraph serial numbers are arranged side by side and ordered in an ascending order, and presented in a separate manner as a single document unit, wherein in the entire screen only the document unit can be seen and no other document unit is displayed in the separate manner.

According to the selected document unit, at the periphery of the unit, logical relationship connection lines are constructed at different positions in accordance with different logical relationships and in accordance with the actual connection situation of the document unit. For example, document unit A is coupled to the below by means of a derivative relationship and coupled to the right by means of a parallel relationship, then an up arrow icon for the derivative relationship is displayed at an upper part of the document unit, and a left arrow icon for the parallel relationship is displayed at the left of the document unit.

Meanwhile, a link to a document identification number of the document where the document unit is located is also provided on a separate presentation image of the document unit.

By clicking the document identification number, the image jumps to a full-text presentation image of the single document, so that the user can view the full document content.

The separate presentation processing for the document unit is completed, and then the processing result is returned and displayed.

According to the selection of the end user, a retrieval operation is performed for the selected document identification number from the document information underlying table, and a full-text presentation function is executed for the single document corresponding to this document unit.

All paragraphs of this document are extracted from the document paragraph content table and are ordered in an ascending order by paragraph serial numbers.

The inter-document relationship set time sequence presentation device is deployed on the document library platform server. It presents in sequence inter-document relation graphs contained in each set in the inter-document relation graph set sequence in accordance with a certain logical relationship, and randomly performs seamless switches between each inter-document relation graph in the set sequence and presents the switched one. The inter-document relation graph set sequence presentation device contains an inter-document relation graph set sequence presentation module as shown in FIG. 2G. The inter-document relation graph set sequence presentation module presents a specified inter-document relation graph set sequence according to the selection of the user.

FIG. 12 shows an interactive method of presenting information in accordance with established rules by the inter-document relation graph set sequence presentation device after a request from an end user is received, and the specific description will be given below:

The system provides a knowledge base containing at least one set of complete inter-document relation graph information and inter-document relation graph set sequence information data structures.

The system performs retrieval operations on the selected inter-document relation graph header table ID from the inter-document relation graph set sequence basic table and the inter-document relation graph set sequence management primary table according to the selection of the end user, and executes a function of presenting the inter-document relation graph set sequence. For the inter-database table relation graph, please refer to FIG. 7.

The presentation processing process for the inter-document relation graph set sequence is: acquiring, according to the serial number of the inter-document relation graph header table selected by the user, all set sequence management primary table IDs related to the serial number from the inter-document relation graph set sequence basic table, and then acquiring, according to the set sequence management primary table ID, all relevant attributes of all the inter-document relation graph set sequences related to the set sequence management primary table from the inter-document relation graph set sequence management primary table, and performing relevant processing;

then acquiring an inter-document relation graph contained in each set sequence from the inter-document relation graph set sequence basic table according to the set sequence management primary table ID of each set sequence; and ranking same by rules;

invoking a standard inter-document relation graph presentation process to construct all basic relation graphs in each relevant set sequence and performing ranking processing; and presenting a certain specific set sequence according to the specific selection of the user, and invoking the standard inter-document relation graph presentation processing process to present a certain standard inter-document relation graph of the set sequence.

So far, the inter-document relation graph set sequence presentation processing is completed, and the processing result is returned and displayed.

FIG. 13 shows the structure of another embodiment of the system of the present invention. In addition to the client access device, the document classification storage management platform server and the document library platform server of the embodiment shown in FIG. 1, the system of the present embodiment further comprises a document interpretation acquisition platform server, wherein the server interacts with both the document classification storage management platform server and the client access device. FIG. 15 shows a detailed structure of the document interpretation acquisition platform server, wherein the document interpretation acquisition platform server comprises a document interpretation acquisition device, a data acquisition review device and a document interpretation storage device. Moreover, the same modules as those of the embodiment of FIG. 1 will not be described herein.

The document interpretation acquisition device acquires data input by a user related to a document interpretation content. The data acquisition review device reviews the input data acquired. The document interpretation storage device adds the input data related to the document interpretation content which qualifies the review to a corresponding original document for storage.

FIG. 14 illustrates the workflow of the system. The document library platform presentation originates from two aspects, one aspect being the same definition and maintenance of multi-dimensional keywords, latest document acquisition, document filing and index establishment for multi-dimensional definition, establishment and maintenance of a relation graph as those of the embodiment of FIG. 1; and the other aspect being document interpretation acquisition, document interpretation review and the setting of a correspondence relationship.

It is noted that, in the present invention, documents that can be defined, associated, searched and presented include, but are not limited to, theses, textbooks, historical literatures, laws and regulations, training coursewares, news and announcements, etc.; include, but are not limited to, multimedia mediums such as characters, audios, videos, webpages. The documents further include, but are not limited to, knowledge of a certain specific professional field (which may be natural scientific knowledge, and may also be social scientific knowledge), and likewise are not limited to Chinese or other characters.

In addition, a specific implementation of the above-mentioned solution further comprises a service architecture constructed on the basis of cloud technologies, for example, services such as data query, program update and file update deployed at a cloud end.

The Embodiment of the System for Identifying, Associating, Searching and Presenting Documents Based on Relation Combination (Stand-Alone Version)

The above-mentioned embodiments are all described on the basis of online documents, and the above-mentioned embodiments of the present invention can further be applied to stand-alone documents after being modified slightly. The system runs on a single apparatus in a stand-alone manner (for example, a computer, a hand-held apparatus, etc., running in a stand-alone manner). The stand-alone system includes a single-document identification and association device, an inter-document relation graph establishment device, an inter-document relation graph set sequence, a document storage device, an inter-document relation graph search device, an inter-document relation graph presentation device, an inter-document relation graph set sequence presentation device, a stand-alone packaging and releasing device and a client installation device.

The single-document identification and association device is used for classifying and defining preset professional terms in accordance with different dimensions and hierarchies, establishing and maintaining a list of keywords for a respective professional field, defining a single document in accordance with different attributes and hierarchies, setting several document units in the single document, performing system identification on the document units with several keywords, defining a list of logical relationships that may be developed between any two single documents or document units, and associating logical relationship between two single documents by means of a set logical relationship category. The single-document identification and association device further includes a keyword dimension setting module, a keyword definition module, a document classification setting module and a document fragment setting module. The keyword dimension setting module sets keyword dimensions. The keyword definition module is coupled to the keyword dimension setting module, and defines keywords corresponding to various keyword dimensions. The document classification setting module performs classification setting on the single document based on the keywords. The document fragment setting module performs classification setting on various document fragments of the document based on the keywords. In addition, the single-document identification and association device further includes a document unit setting module, a document unit identification module and a logic association module. The document unit setting module combines document fragments of the single document having the same keyword identification into several document units. The document unit identification module performs the system identification on the document units with several keywords. The logic association module defines the list of logical relationships that may be developed between any two single documents, and associates logical relationship between two single documents or document units in the system by means of the set logical relationship category.

The inter-document relation graph establishment device defines an inter-document relation graph and defines relationships among elements of the inter-document relation graph. The inter-document relation graph establishment device further includes a keyword naming module and an inter-document relation graph generation module. The keyword naming module names any specific inter-document relation graph with a specific group of keywords. The inter-document relation graph generation module generates the inter-document relation graph by presenting a series of document units arranged in accordance with a specific logical relationship among the document units in the inter-document relation graph, presenting graphical identification of the logical relationship among the document units, and presenting a single document unit.

The inter-document relation graph set sequence construction device combines, into one set, a plurality of visualized inter-document relation graphs of which the names have a group of like term keywords and which have specific logical relationships among one another, and names the same with the group of like term keywords in a certain logic order, and then also defines sets having similar or close logics in a combination manner, and sequentializes the same.

The document storage device is used for storing relevant information to a database of the single apparatus according to the invocation of the single-document identification and association device, the inter-document relation graph establishment device and the inter-document relation graph set sequence construction device, and archiving files in a specified format to the database of the single apparatus.

The inter-document relation graph search device establishes an inter-document relation graph index having an auto-maintenance function, and performs a full-text retrieval for an inter-document relation graph name according to one or more query terms input at one time. The inter-document relation graph search device further comprises an index establishment module and a keyword retrieval module. The index establishment module establishes a set of inter-document relation graph indices having an auto-maintenance function. The keyword retrieval module performs a full-text retrieval for the inter-document relation graph name according to one or more query terms input by a user at one time.

The inter-document relation graph presentation device presents the inter-document relation graph, separately presents a certain document unit in the inter-document relation graph and presents full text of a single document corresponding to the certain document unit in the inter-document relation graph. The inter-document relation graph presentation device further includes the inter-document relation graph presentation module, the document unit presentation module and the single-document presentation module. The inter-document relation graph presentation module presents a specified inter-document relation graph according to a search result of the user. The document unit presentation module presents a certain document unit in the specified inter-document relation graph according to the search result of the user. The single-document presentation module presents full text of a single document corresponding to the certain document unit in the specified inter-document relation graph according to the search result of the user.

The inter-document relation graph set sequence presentation device presents in sequence inter-document relation graphs contained in each set in the inter-document relation graph set sequence in accordance with a certain logical relationship, and randomly performs seamless switches between each inter-document relation graph in the set sequence and presents the switched one.

The stand-alone packaging and releasing device packages data ultimately saved by the document storage device and the files in the specified format archived in the document storage device, a program-executable file and matched subsidiary files for the inter-document relation graph search device, a program-executable file and matched subsidiary files for the inter-document relation graph presentation device, and a program-executable file and matched subsidiary files for the inter-document relation graph set sequence presentation device into one complete release package, and generates targeted program-executable files and matched subsidiary files for the releasing device depending on different target platforms.

The client installation device completely unfolds the release package to the single apparatus by executing the program-executable files for the releasing device, the program-executable files comprising: the data ultimately saved by the document storage device and the files in the specified format archived in the document storage device, the program-executable file and the matched subsidiary files for the inter-document relation graph search device, the program-executable file and the matched subsidiary files for the inter-document relation graph presentation device, and the program-executable file and the matched subsidiary files for the inter-document relation graph set sequence presentation device.

The system further includes a document interpretation acquisition subsystem, wherein the document interpretation acquisition subsystem comprises: a document interpretation acquisition device, a data acquisition review device and a document interpretation storage device. The document interpretation acquisition device acquires data input by a user related to a document interpretation content. The data acquisition review device reviews the input data acquired. The document interpretation storage device links the input data related to the document interpretation content which qualifies the review to a corresponding document or inter-document relation graph for storage.

In the stand-alone embodiment, the logical relationships between documents include, but are not limited to, a derivative relationship, a parallel relationship, an OR relationship, an AND relationship, a containment relationship, a revision relationship, a coverage relationship, a negation relationship, wherein each logical relationship between documents corresponds to a unique icon in the system. The documents include, but are not limited to, theses, textbooks, historical literatures, laws and regulations, training coursewares, news and announcements, and the documents further include, but are not limited to, multimedia mediums such as characters, audios, videos, webpages.

The above-mentioned embodiments are provided for a person skilled in the art to implement and use the present invention. A person skilled in the art can make various modifications or changes to the above-mentioned embodiments without departing from the inventive concept of the present invention. Thus, the scope of the present invention is not limited to the above-mentioned embodiments, but should be the widest scope consistent with the innovative features mentioned in the claims.

What is claimed is:

1. A system for identifying, associating, searching and presenting documents based on relation combination, comprising a document classification storage management platform server, a document library platform server and a client access device, wherein the document classification storage management platform server comprises a single-document identification and association device, an inter-document relation graph establishment device and an inter-document relation graph set sequence construction device; the document library platform server comprises an inter-document relation graph search device, an inter-document relation graph presentation device and an inter-document relation graph set sequence presentation device; wherein primary nodes of a document storage device are deployed on the document classification storage management platform server, and mirrored versions of the primary nodes of the document storage device are deployed on the document library platform server, wherein the single-document identification and association device is configured to classify and define preset professional terms in accordance with different dimensions and hierarchies, establish and maintain a list of keywords for a respective professional field, defines a single document in accordance with different attributes and hierarchies, set document units in the single document, perform system identification on the document units based on a plurality of keywords, define a list of logical relationships that may be developed between any two single documents or document units, and associate a logical relationship between any two single documents based on a set logical relationship category;

the inter-document relation graph establishment device is configured to define an inter-document relation graph and defines relationships among elements of the inter-document relation graph;

the inter-document relation graph set sequence construction device is configured to combine a plurality of visualized inter-document relation graphs into one set, wherein the names of the graphs involve a group of like term keywords and have specific logical relationships among one another, and the inter-document relation graph set sequence construction device is further configured to name the graphs with the group of like term keywords in a certain logic order, and then define sets having similar or close logics in a combination manner, and sequentialize the same;

the document storage device is configured to store relevant information in a database of the document classification storage management platform server according to the invocation of the single-document identification and association device, the inter-document relation graph establishment device and the inter-document relation graph set sequence construction device, archive files in a specified format to the document library platform server, and transfer relevant data information between the document classification storage management platform server and the document library platform server via a data exchange engine;

the inter-document relation graph search device is configured to establish an inter-document relation graph index with an auto-maintenance function, and perform a full-text retrieval for an inter-document relation graph name according to one or more query terms input at one time;

the inter-document relation graph presentation device is configured to present the inter-document relation graph, separately present a certain document unit in the inter-document relation graph and present a full text of a single document corresponding to the certain document unit in the inter-document relation graph; and the inter-document relation graph set sequence presentation device is configured to present in sequence inter-document relation graphs contained in each set in the inter-document relation graph set sequence in accordance with a certain logical relationship, and randomly perform seamless switches between each inter-document relation graph in the set sequence and present the switched one;

wherein the single-document identification and association device further comprises:

a keyword dimension setting module for setting keyword dimensions;

a keyword definition module coupled to the keyword dimension setting module, for defining keywords corresponding to various keyword dimensions;

a document classification setting module for performing classification setting on the single document based on the keywords; and a document fragment setting module for performing classification setting on various document fragments of the document based on the keywords.

2. The system for identifying, associating, searching and presenting documents based on relation combination according to claim 1, characterized in that the single-document identification and association device further comprises:

a document unit setting module for combining document fragments of the single document having the same keyword identification into a plurality of document units;

a document unit identification module for performing system identification on the document units with a plurality of keywords; and a logic association module for defining the list of logical relationships that may be developed between any two single documents, and associating the logical relationship between two single documents or document units in the system based on the set logical relationship category.

3. The system for identifying, associating, searching and presenting documents based on relation combination according to claim 2, characterized in that the inter-document relation graph establishment device further comprises:
 a keyword naming module for naming any specific inter-document relation graph with a specific group of keywords; and
 an inter-document relation graph generation module for generating the inter-document relation graph by presenting a series of document units arranged in accordance with a specific logical relationship among the document units in the inter-document relation graph, presenting graphical identification of the logical relationship among the document units, and presenting a single document unit.

4. The system for identifying, associating, searching and presenting documents based on relation combination according to claim 3, characterized in that the inter-document relation graph set sequence construction device further comprises:
 an inter-document relation graph set sequence generation module for combining, into one set, a plurality of visualized inter-document relation graphs of which the names have a group of like term keywords and which have specific logical relationships among one another, and naming the same with the group of like term keywords in a certain logic order, wherein inter-document relation graphs in the set are arranged in a certain logical relationship, and then defining sets having similar or close logics in a combination manner and arranging the set in accordance with a certain rule, and sequentializing the same.

5. The system for identifying, associating, searching and presenting documents based on relation combination according to claim 4, characterized in that the document storage device further comprises:
 a relational database management system for establishing a document classification storage management platform;
 a document library management system for establishing a document library platform;
 a write operation module for performing write operations on a database when the devices are invoked;
 a save operation module for archiving to save corresponding single-document files or inter-document relation graph files when the devices are invoked; and
 a platform data transmission module for transferring relevant data between the document classification storage management platform server and the document library platform server via the data exchange engine.

6. The system for identifying, associating, searching and presenting documents based on relation combination according to claim 5, characterized in that the inter-document relation graph search device further comprises:
 an index establishment module for establishing a set of inter-document relation graph indices with an auto-maintenance function; and
 a keyword retrieval module for performing a full-text retrieval for the inter-document relation graph name according to query terms input by a user.

7. The system for identifying, associating, searching and presenting documents based on relation combination according to claim 6, characterized in that the inter-document relation graph presentation device further comprises:
 an inter-document relation graph presentation module for presenting a specified inter-document relation graph according to a search result of the user;
 a document unit presentation module for presenting a certain document unit in the specified inter-document relation graph according to the search result of the user; and
 a single-document presentation module for presenting a full text of a single document corresponding to the certain document unit in the specified inter-document relation graph according to the search result of the user.

8. The system for identifying, associating, searching and presenting documents based on relation combination according to claim 7, characterized in that the inter-document relation graph set sequence presentation device further comprises:
 an inter-document relation graph set sequence presentation module for presenting in sequence inter-document relation graphs contained in each set in the inter-document relation graph set sequence in accordance with a certain logical relationship, and randomly performing seamless switches between each inter-document relation graph in the set sequence and presenting the switched one in a layer-by-layer manner.

9. The system for identifying, associating, searching and presenting documents based on relation combination according to claim 1, characterized in that the system further comprises a document interpretation acquisition platform server which comprises:
 a document interpretation acquisition device for acquiring data input by a user related to a document interpretation content;
 a data acquisition review device for reviewing the input data acquired; and
 a document interpretation storage device for linking the input data related to the document interpretation content which qualifies the review to a corresponding document or inter-document relation graph for storage.

10. The system for identifying, associating, searching and presenting documents based on relation combination according to claim 1, characterized in that the logical relationships between documents include, but are not limited to, a derivative relationship, a parallel relationship, an OR relationship, an AND relationship, a containment relationship, a revision relationship, a coverage relationship, a negation relationship, wherein each logical relationship between documents corresponds to a unique icon in the system.

11. The system for identifying, associating, searching and presenting documents based on relation combination according to claim 1, characterized in that a detailed implementation further comprises a service architecture constructed on the basis of cloud technologies for implementing services such as data query, program update and file update at a cloud end.

12. The system for identifying, associating, searching and presenting documents based on relation combination according to claim 1, characterized in that the documents include, but are not limited to, theses, textbooks, historical literatures, laws and regulations, training coursewares, news and announcements, and the documents further include, but are not limited to, multimedia mediums such as characters, audios, videos, webpages.

* * * * *